(12) United States Patent
Yamakawa

(10) Patent No.: US 8,611,024 B2
(45) Date of Patent: Dec. 17, 2013

(54) IMAGE PICKUP LENS AND IMAGE PICKUP APPARATUS

(75) Inventor: Hiromitsu Yamakawa, Saitama (JP)

(73) Assignee: Fujifilm Corporation, Tokyo (JP)

( * ) Notice: Subject to any disclaimer, the term of this patent is extended or adjusted under 35 U.S.C. 154(b) by 42 days.

(21) Appl. No.: 13/078,577

(22) Filed: Apr. 1, 2011

(65) Prior Publication Data
US 2011/0242683 A1    Oct. 6, 2011

(30) Foreign Application Priority Data

Apr. 1, 2010   (JP) ................................. 2010-084808

(51) Int. Cl.
*G02B 3/02* (2006.01)
*G02B 13/18* (2006.01)

(52) U.S. Cl.
USPC .......................................................... 359/715

(58) Field of Classification Search
USPC .......................................... 359/715, 781, 708
See application file for complete search history.

(56) References Cited

U.S. PATENT DOCUMENTS

| | | | |
|---|---|---|---|
| 7,280,289 B2 | 10/2007 | Yamakawa | |
| 7,375,906 B2 | 5/2008 | Hirose et al. | |
| 7,518,809 B2 | 4/2009 | Yamakawa et al. | |
| 7,697,221 B2 | 4/2010 | Mori | |
| 2008/0239517 A1 | 10/2008 | Mori | |
| 2008/0316618 A1* | 12/2008 | Yamakawa et al. | 359/781 |

FOREIGN PATENT DOCUMENTS

| | | |
|---|---|---|
| JP | 2002-244031 | 8/2002 |
| JP | 2005-227426 | 8/2005 |
| JP | 2008-242040 | 10/2008 |

OTHER PUBLICATIONS

Japanese Official Action—2010-084808—Sep. 3, 2013 (with partial English translation).

* cited by examiner

*Primary Examiner* — James Greece

(74) *Attorney, Agent, or Firm* — Young & Thompson

(57) ABSTRACT

An image pickup lens having the following disposed from an object side in the order listed below: a first lens having a negative meniscus shape with a concave surface on an image side, a second lens having a negative meniscus shape with a concave surface on the object side adjacent to an optical axis, a third positive lens having a convex surface on the image side adjacent to the optical axis, an aperture, and a fourth lens having a bi-convex shape adjacent to the optical axis. Each of the second, third, and fourth lenses has an aspherical surface on each side.

24 Claims, 17 Drawing Sheets

EXAMPLE 1

EXAMPLE 1
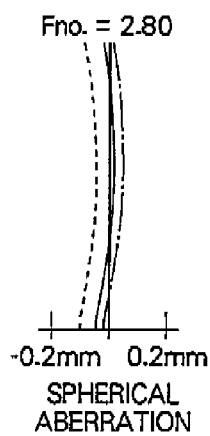
Fno. = 2.80
-0.2mm 0.2mm
SPHERICAL ABERRATION
FIG.9A
— e-LINE
----- g-LINE
—·— C-LINE
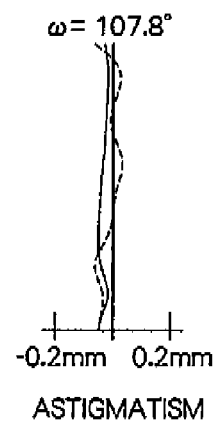
ω= 107.8°
-0.2mm 0.2mm
ASTIGMATISM
FIG.9B
— SAGGITAL
----- TANGENTIAL
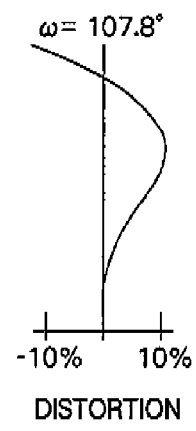
ω= 107.8°
-10%  10%
DISTORTION
FIG.9C
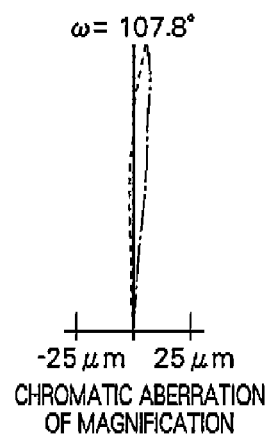
ω= 107.8°
-25μm  25μm
CHROMATIC ABERRATION OF MAGNIFICATION
FIG.9D
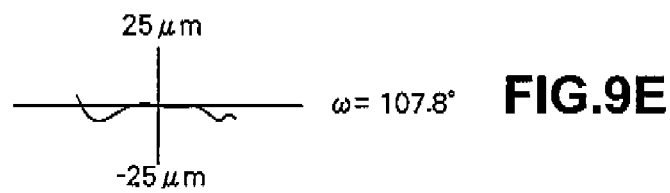
ω= 107.8°  FIG.9E
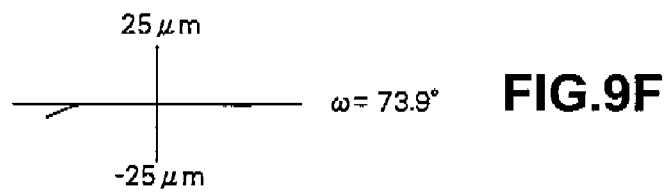
ω= 73.9°  FIG.9F
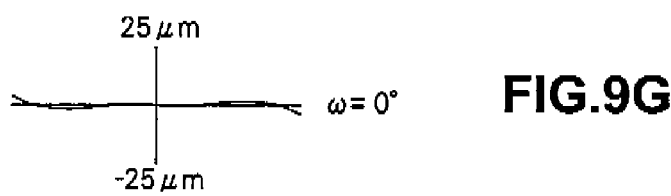
ω= 0°  FIG.9G

EXAMPLE 2
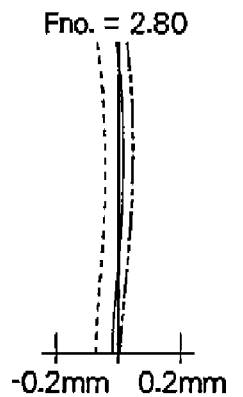
Fno. = 2.80
-0.2mm  0.2mm
SPHERICAL ABERRATION
FIG.10A
— e-LINE
----- g-LINE
—·— C-LINE
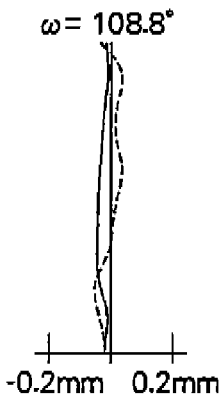
ω= 108.8°
-0.2mm  0.2mm
ASTIGMATISM
FIG.10B
— SAGGITAL
----- TANGENTIAL
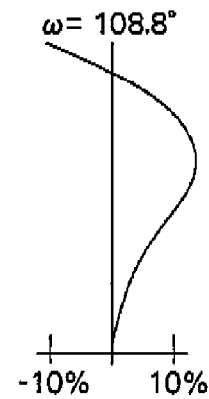
ω= 108.8°
-10%  10%
DISTORTION
FIG.10C
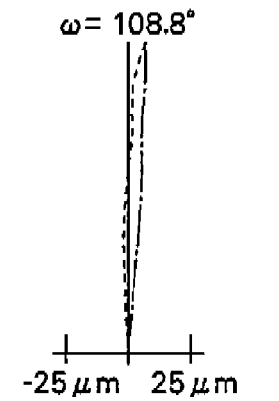
ω= 108.8°
-25μm  25μm
CHROMATIC ABERRATION OF MAGNIFICATION
FIG.10D
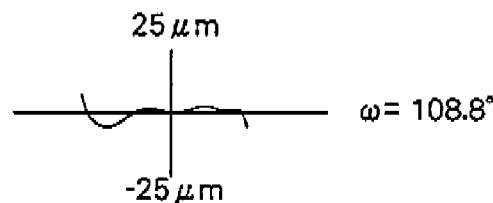
ω= 108.8°  FIG.10E
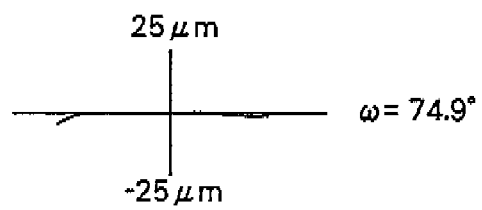
ω= 74.9°  FIG.10F
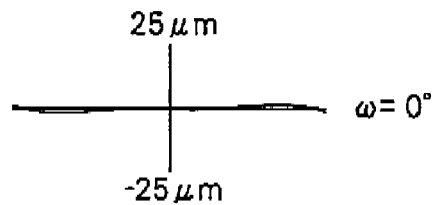
ω= 0°  FIG.10G

EXAMPLE 3
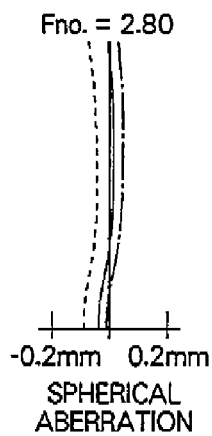
Fno. = 2.80
-0.2mm 0.2mm
SPHERICAL ABERRATION
FIG.11A
— e-LINE
---- g-LINE
—·— C-LINE
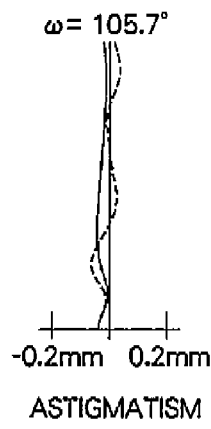
ω= 105.7°
-0.2mm 0.2mm
ASTIGMATISM
FIG.11B
— SAGGITAL
---- TANGENTIAL
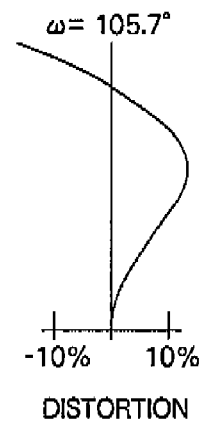
ω= 105.7°
-10% 10%
DISTORTION
FIG.11C
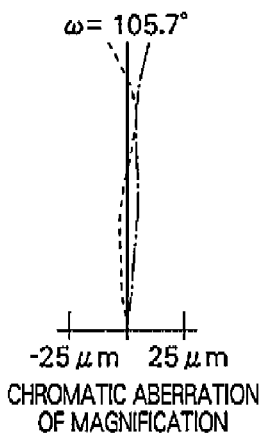
ω= 105.7°
-25μm 25μm
CHROMATIC ABERRATION OF MAGNIFICATION
FIG.11D
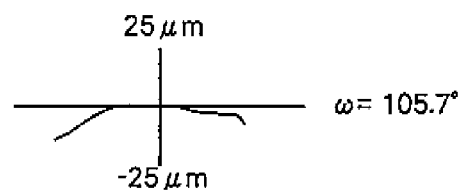
ω= 105.7° FIG.11E
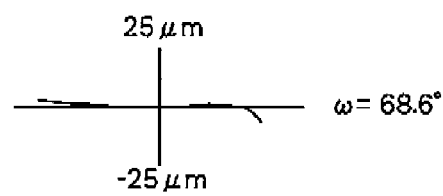
ω= 68.6° FIG.11F
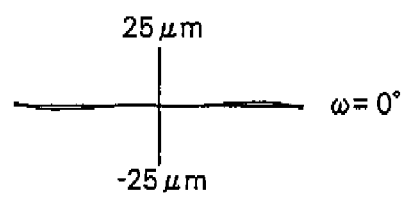
ω= 0° FIG.11G

EXAMPLE 4
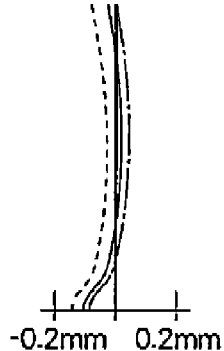
Fno. = 2.80
-0.2mm 0.2mm
SPHERICAL ABERRATION
FIG.12A
— e-LINE
---- g-LINE
—- C-LINE
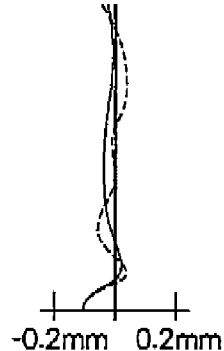
ω = 104.5°
-0.2mm 0.2mm
ASTIGMATISM
FIG.12B
— SAGGITAL
---- TANGENTIAL
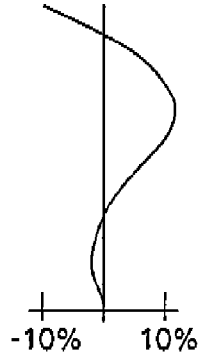
ω = 104.5°
-10% 10%
DISTORTION
FIG.12C
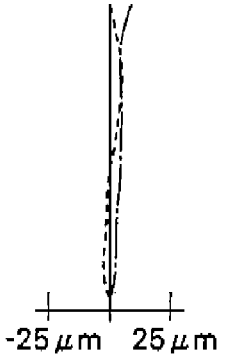
ω = 104.5°
-25μm 25μm
CHROMATIC ABERRATION OF MAGNIFICATION
FIG.12D
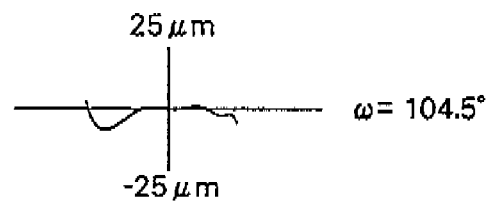
ω = 104.5° FIG.12E
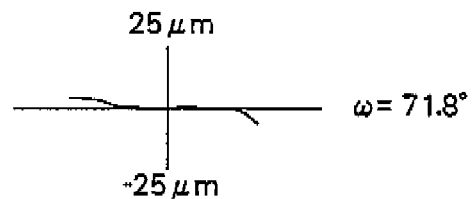
ω = 71.8° FIG.12F
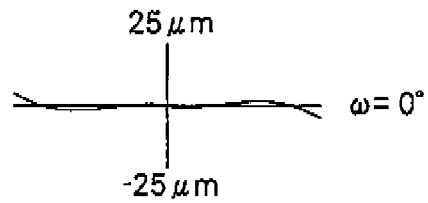
ω = 0° FIG.12G

EXAMPLE 5
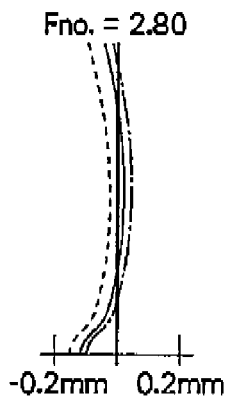
SPHERICAL ABERRATION
FIG.13A
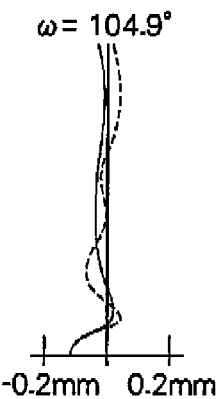
ASTIGMATISM
FIG.13B
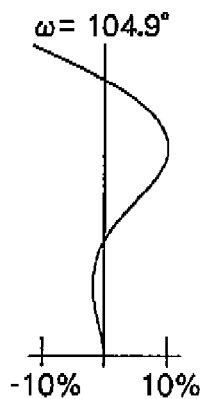
DISTORTION
FIG.13C
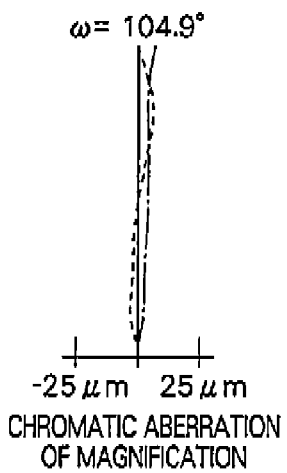
CHROMATIC ABERRATION OF MAGNIFICATION
FIG.13D
—— e-LINE
----- g-LINE
—·— C-LINE
—— SAGGITAL
----- TANGENTIAL
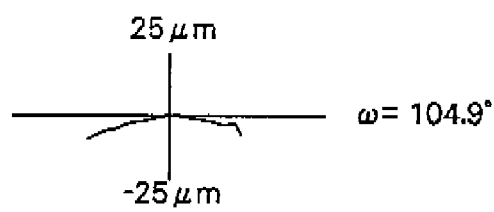
$\omega = 104.9°$ FIG.13E
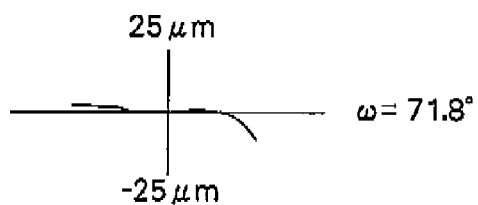
$\omega = 71.8°$ FIG.13F
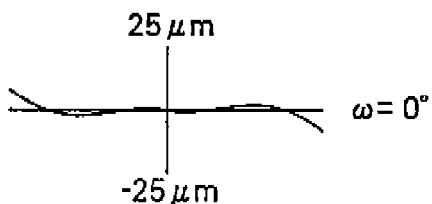
$\omega = 0°$ FIG.13G EXAMPLE 6
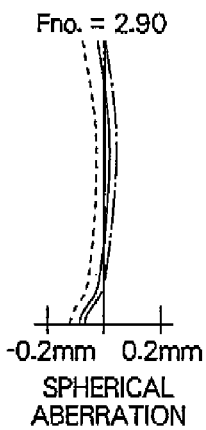
Fno. = 2.90
-0.2mm 0.2mm
SPHERICAL ABERRATION
FIG.14A
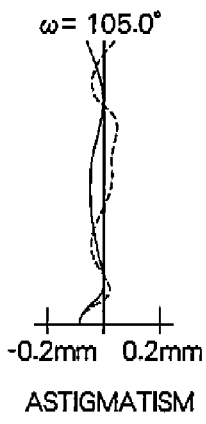
ω= 105.0°
-0.2mm 0.2mm
ASTIGMATISM
FIG.14B
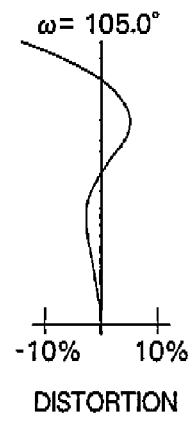
ω= 105.0°
-10% 10%
DISTORTION
FIG.14C
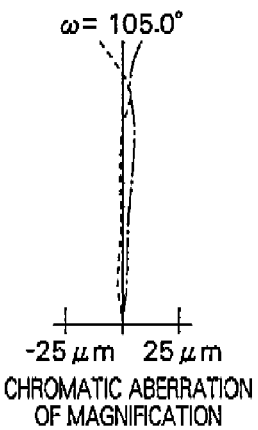
ω= 105.0°
-25μm 25μm
CHROMATIC ABERRATION OF MAGNIFICATION
FIG.14D
— e-LINE
---- g-LINE
—-— C-LINE
— SAGGITAL
---- TANGENTIAL
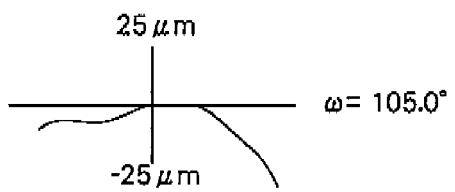
ω= 105.0° FIG.14E
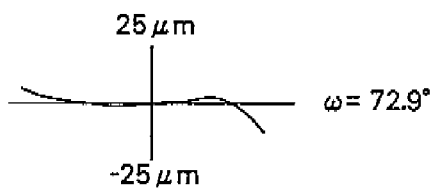
ω= 72.9° FIG.14F
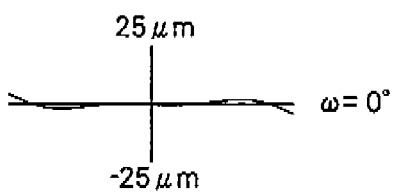
ω= 0° FIG.14G

EXAMPLE 7
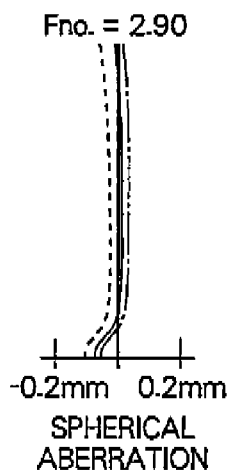
Fno. = 2.90
-0.2mm   0.2mm
SPHERICAL ABERRATION
FIG.15A
— e-LINE
----- g-LINE
—-— C-LINE
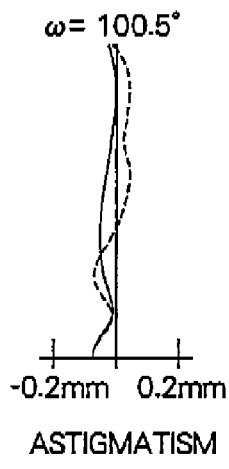
ω= 100.5°
-0.2mm   0.2mm
ASTIGMATISM
FIG.15B
—— SAGGITAL
----- TANGENTIAL
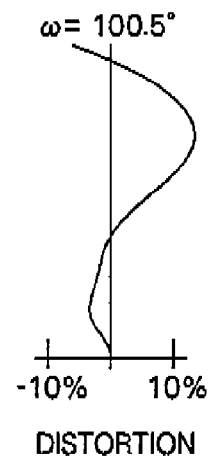
ω= 100.5°
-10%   10%
DISTORTION
FIG.15C
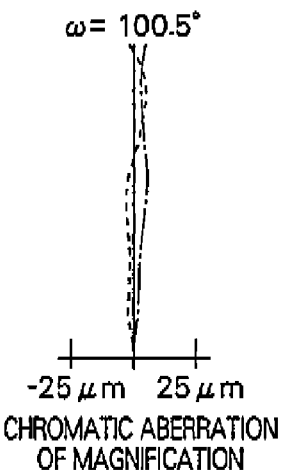
ω= 100.5°
-25μm   25μm
CHROMATIC ABERRATION OF MAGNIFICATION
FIG.15D
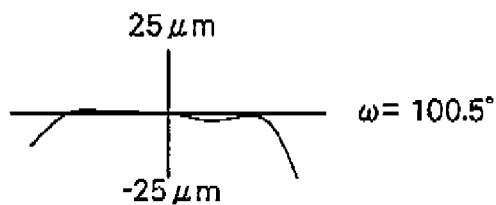
ω= 100.5°  FIG.15E
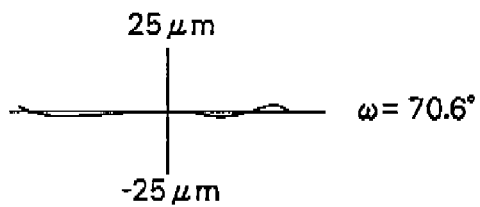
ω= 70.6°  FIG.15F
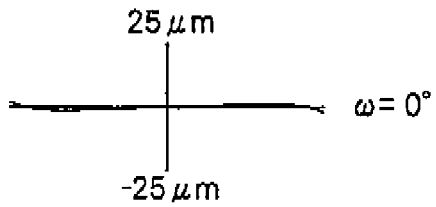
ω= 0°  FIG.15G

EXAMPLE 8
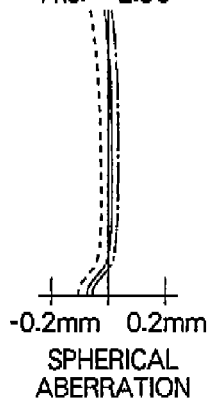
Fno. = 2.90
-0.2mm 0.2mm
SPHERICAL ABERRATION
FIG.16A
—— e-LINE
----- g-LINE
----- C-LINE
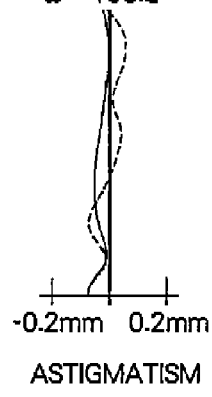
ω= 103.2°
-0.2mm 0.2mm
ASTIGMATISM
FIG.16B
—— SAGGITAL
----- TANGENTIAL
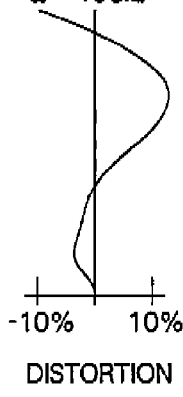
ω= 103.2°
-10%  10%
DISTORTION
FIG.16C
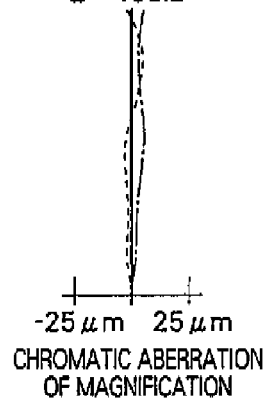
ω= 103.2°
-25μm  25μm
CHROMATIC ABERRATION OF MAGNIFICATION
FIG.16D
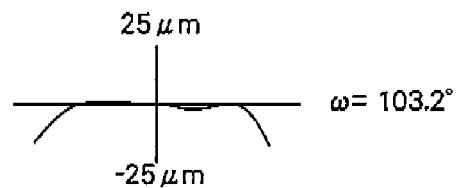
ω= 103.2°  FIG.16E
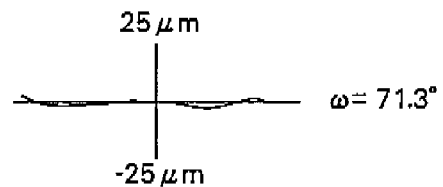
ω= 71.3°  FIG.16F
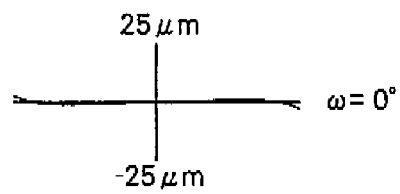
ω= 0°  FIG.16G

IMAGE PICKUP LENS AND IMAGE PICKUP APPARATUS

BACKGROUND OF THE INVENTION

1. Field of the Invention

The present invention relates to an image pickup lens and an image pickup apparatus, and more particularly to a wide angle image pickup lens which is appropriate for use with a vehicle camera, a surveillance camera, or the like which includes an image sensor, such as a CCD (charge coupled device) or a CMOS (complementary metal oxide semiconductor), and an image pickup apparatus having the image pickup lens.

2. Description of the Related Art

Image sensors, such as CCD or CMOS devices, have recently been greatly downsized with increased pixel counts. Consequently, image pickup devices themselves and image pickup lenses to be mounted on the devices are also required to be reduced in size and weight. In the mean time, image pickup lenses used in vehicle cameras and surveillance cameras are required to have a high weather resistance in addition to a wide angle of view and high optical performance to secure a favorable field of view in a wide range.

Further, due to demand for cost reduction for the manufacture of image pickup lenses used in the aforementioned applications, an optical system with less number of lenses is sought. Conventional image pickup lens with four lenses are described, for example, in Japanese Unexamined Patent Publication No. 2002-244031 (Patent Document 1), U.S. Pat. No. 7,280,289 (Patent Document 2), U.S. Pat. No. 7,375,906 (Patent Document 3), Japanese Unexamined Patent Publication No. 2005-227426 (Patent Document 4), and U.S. Pat. No. 7,518,809 (Patent Document 5).

Recently, there has been a growing demand for wider angles, such as a demand for a total angle of view of over 180° in the application fields of vehicle cameras, surveillance cameras, and the like. Recently, there has also been a growing demand for image pickup lenses having high resolution and high optical performance to obtain a favorable image in a wide range of imaging area along with the downsizing of image sensors with increased pixel counts. It has been difficult, however, for conventional lens systems to realize both a compact and inexpensive structure and to satisfy the recent demands of wider angle and high optical performance.

Patent Document 1 describes, as a wide angle lens of Example 3, a lens system that includes four lenses disposed from the object side in the order of first to fourth lenses with an aperture between the third and fourth lenses. Although, Patent Document 1 does not describe the F-number and the angle of view of the lens system, it is quite unlikely that the lens system complies with a specification of over 180° of total angle of view when considering that the refractive index of the first lens is about 1.52 and the first and second lenses have relatively small negative powers.

Lenses described in Patent Documents 2 and 3 have total angles of view of about 140° to 165° and about 152° to 164° respectively. Thus, the lenses can not comply with the recent demand of wider angles of view over 180°. The lens described in Patent Document 4 has an F-number of 2.5 to 2.8 with a total angle of view over 180°, but when a projection system with an ideal image height of 2×f×tan (φ/2), wherein f is the focal length of the entire system and φ is the half angle of view, is employed, the system has a disadvantage that the distortion increases rapidly and significantly on the negative side when the half angle of view exceeds 80° and an image in the outermost peripheral portion becomes small. Patent Document 5 describes an example having a total angle of view close to 190° with distortion and chromatic aberration of magnification being corrected satisfactorily, but astigmatism remains. Therefore, when the lens is used in conjunction with an image sensor having a high pixel count, the lens may be required a wider field of depth.

In view of the circumstances described above, it is an object of the present invention to provide a compact and inexpensive image pickup lens, yet capable of realizing high optical performance, and an image pickup apparatus having the image pickup lens.

SUMMARY OF THE INVENTION

An image pickup lens of the present invention is an image pickup lens, including the following disposed from an object side in the order listed below:

a first lens which is a meniscus lens having a negative power and a concave surface on an image side;

a second lens having an aspherical surface on each of the object and image sides and a negative power adjacent to an optical axis, the object side surface having a concave shape adjacent to the optical axis and the image side surface having a convex shape adjacent to the optical axis;

a third lens having an aspherical surface on each the object and image sides and a positive power adjacent to the optical axis, the image side surface having a convex shape adjacent to the optical axis;

an aperture; and a fourth lens having an aspherical surface on each of the object and image sides and a positive power adjacent to the optical axis, the object side surface having a convex shape adjacent to the optical axis and the image side surface having a convex shape adjacent to the optical axis.

The term "a meniscus lens having a negative power and a concave surface on an image side" as used herein with respect to the first lens of the image pickup lens of the present invention is applicable to a paraxial region if the first lens is an aspherical lens. Further, the term "adjacent to an optical axis" as used herein is synonymous to the "paraxial region".

Preferably, the image pickup lens of the present invention satisfies Conditional Expressions (1) to (5) given below. A preferred embodiment of the present invention may be an embodiment that satisfies any one of Conditional Expressions (1) to (5) given below or a combination of any of two or more of them.

$$-12.0 < f1/f < -5.0 \tag{1}$$

$$0.15 < d2/L < 0.25 \tag{2}$$

$$0.02 < d4/L < 0.05 \tag{3}$$

$$-1.2 < f2/f3 < -0.1 \tag{4}$$

$$4.0 < L/f34 < 8.0 \tag{5}$$

where,
- f: a focal length of the entire system;
- f1: a focal length of the first lens;
- f2: a focal length of the second lens;
- f3: a focal length of the third lens;
- f34: a combined focal length of the third lens and the fourth lens,
- d2: a distance between the first lens and the second lens on the optical axis;
- d4: a distance between the second lens and the third lens on the optical axis; and L: a distance from a surface apex of the object side surface of the first lens to an image plane on the optical axis.

In the image pickup lens of the present invention, the object side surface of the third lens may have a convex shape adjacent to the optical axis. If that is the case, it is preferable that the image pickup lens of the present invention satisfies Conditional Expression (6A) given below.

$$-5.0 < r5/r4 < 0.0 \quad (6A)$$

where,
r4: a radius of paraxial curvature of the image side surface of the second lens; and
r5: a radius of paraxial curvature of the object side surface of the third lens.

In the image pickup lens of the present invention, the object side surface of the third lens may have a concave shape adjacent to the optical axis. If that is the case, it is preferable that the image pickup lens of the present invention satisfies Conditional Expression (6B) given below.

$$4.0 < r5/r4 < 8.0 \quad (6B)$$

where,
r4: a radius of paraxial curvature of the image side surface of the second lens, and
r5: a radius of paraxial curvature of the object side surface of the third lens.

Note that, an air equivalent length is used for a back focus portion of L described above. With respect r4 and r5, a positive sign is used if the surface is convex on the object side and a negative sign is used if the surface is convex on the image side. In the image pickup lens of the present invention, it is preferable that an Abbe number of the material of the first lens with respect to d-line is not less than 40, an Abbe number of the material of the second lens with respect to d-line is not less than 50, an Abbe number of the material of the third lens with respect to d-line is not greater than 40, and an Abbe number of the material of the fourth lens with respect to d-line is not less than 50.

Preferably, the image pickup lens of the present invention is configured to have a total angle of view of greater than 200°.

An image pickup apparatus of the present invention is an apparatus that includes the image pickup lens of the present invention described above.

According to the image pickup lens of the present invention, a compact and inexpensive lens system, yet having a wide angle of view and high optical performance, may be provided in a four lens system by appropriately selecting the power and shape of each lens and disposing the aperture at an appropriate position.

The image pickup apparatus of the present invention includes the image pickup lens of the present invention, so that the apparatus may be structured compactly and inexpensively, yet allowing wide angle imaging and acquisition of high quality images.

BRIEF DESCRIPTION OF THE DRAWINGS

FIG. 9A to 9G illustrate respective aberrations of the image pickup lens of Example 1 of the present invention.

FIG. 10A to 10G illustrate respective aberrations of the image pickup lens of Example 2 of the present invention.

FIG. 11A to 11G illustrate respective aberrations of the image pickup lens of Example 3 of the present invention.

FIG. 12A to 12G illustrate respective aberrations of the image pickup lens of Example 4 of the present invention.

FIG. 13A to 13G illustrate respective aberrations of the image pickup lens of Example 5 of the present invention.

FIG. 14A to 14G illustrate respective aberrations of the image pickup lens of Example 6 of the present invention.

FIG. 15A to 15G illustrate respective aberrations of the image pickup lens of Example 7 of the present invention.

FIG. 16A to 16G illustrate respective aberrations of the image pickup lens of Example 8 of the present invention.

DESCRIPTION OF THE PREFERRED EMBODIMENTS

Hereinafter, embodiments of the present invention will be described in detail with reference to the accompanying drawings. FIGS. 1 to 8 are cross-sectional views of image pickup lenses according to embodiments of the present invention, illustrating example structures thereof. The lenses shown in FIGS. 1 to 8 correspond respectively to lenses of Examples 1 to 8, to be described later. Basic structures of examples shown in FIGS. 1 to 8 are identical and are illustrated in the same manner. Therefore, description of image pickup lenses according to embodiments of the present invention will be made here with reference mainly to FIG. 1.

Figure 1:
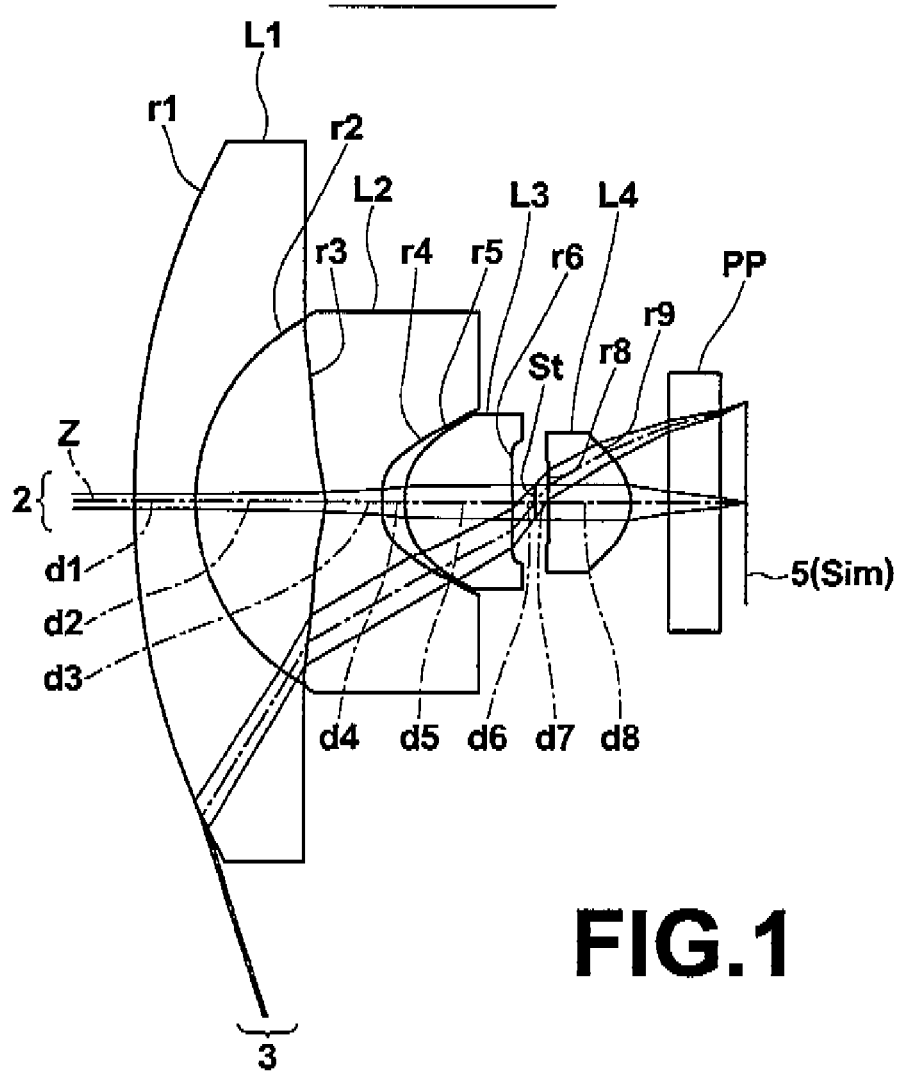
FIG. 1 is a cross-sectional view of an image pickup lens of Example 1 of the present invention, illustrating a lens configuration and an optical path thereof.
Figure 2:
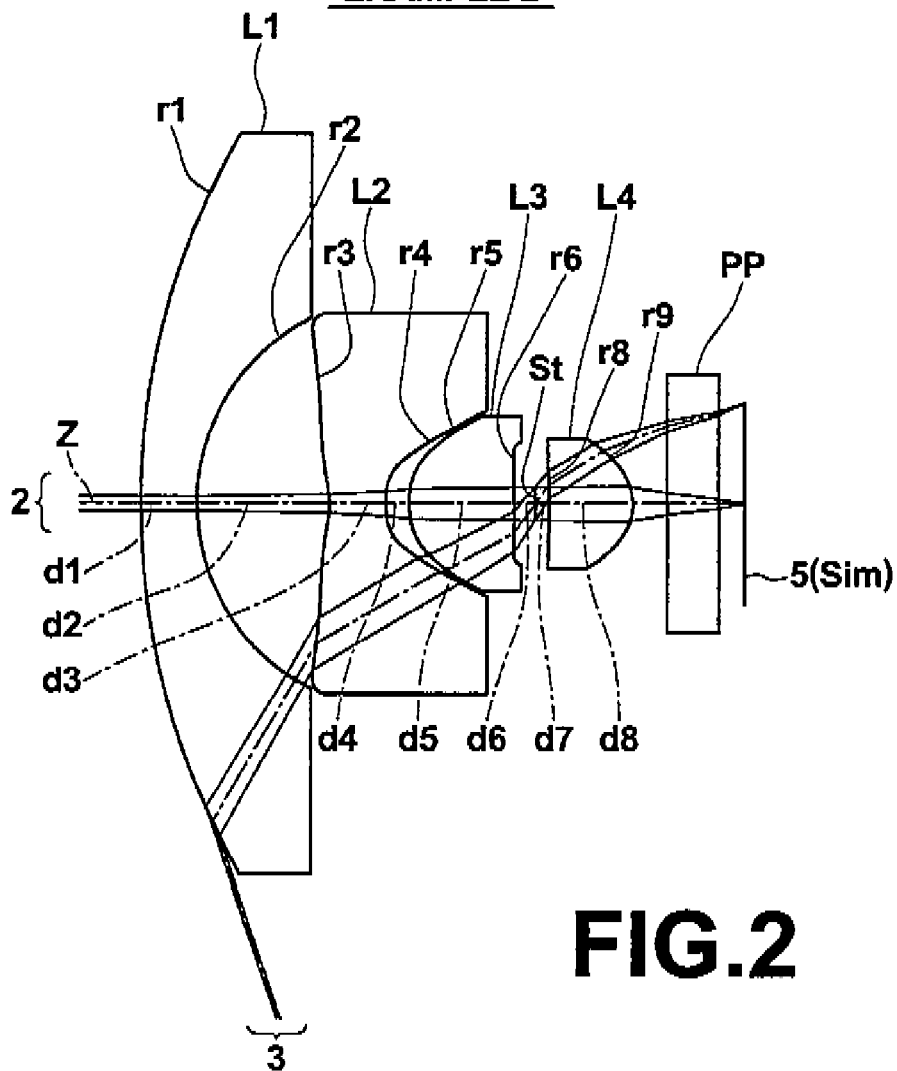
FIG. 2 is a cross-sectional view of an image pickup lens of Example 2 of the present invention, illustrating a lens configuration and an optical path thereof.
Figure 3:
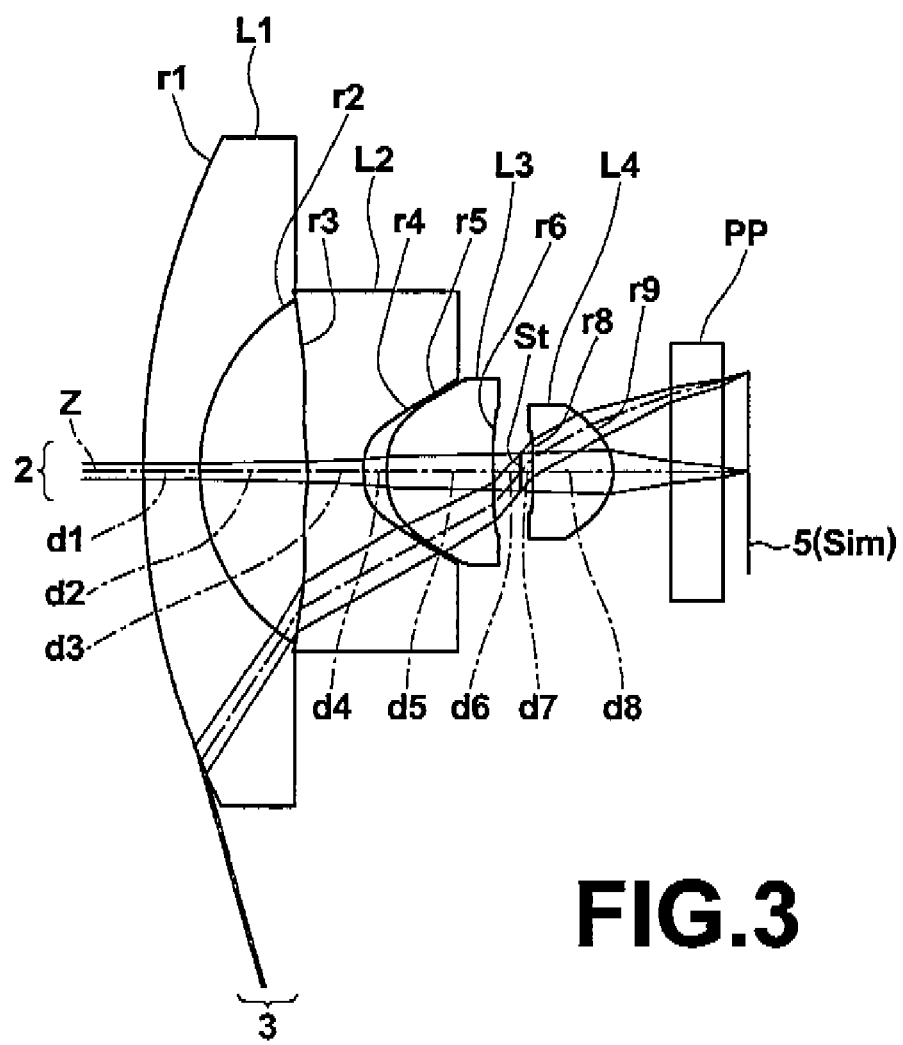
FIG. 3 is a cross-sectional view of an image pickup lens of Example 3 of the present invention, illustrating a lens configuration and an optical path thereof.
Figure 4:
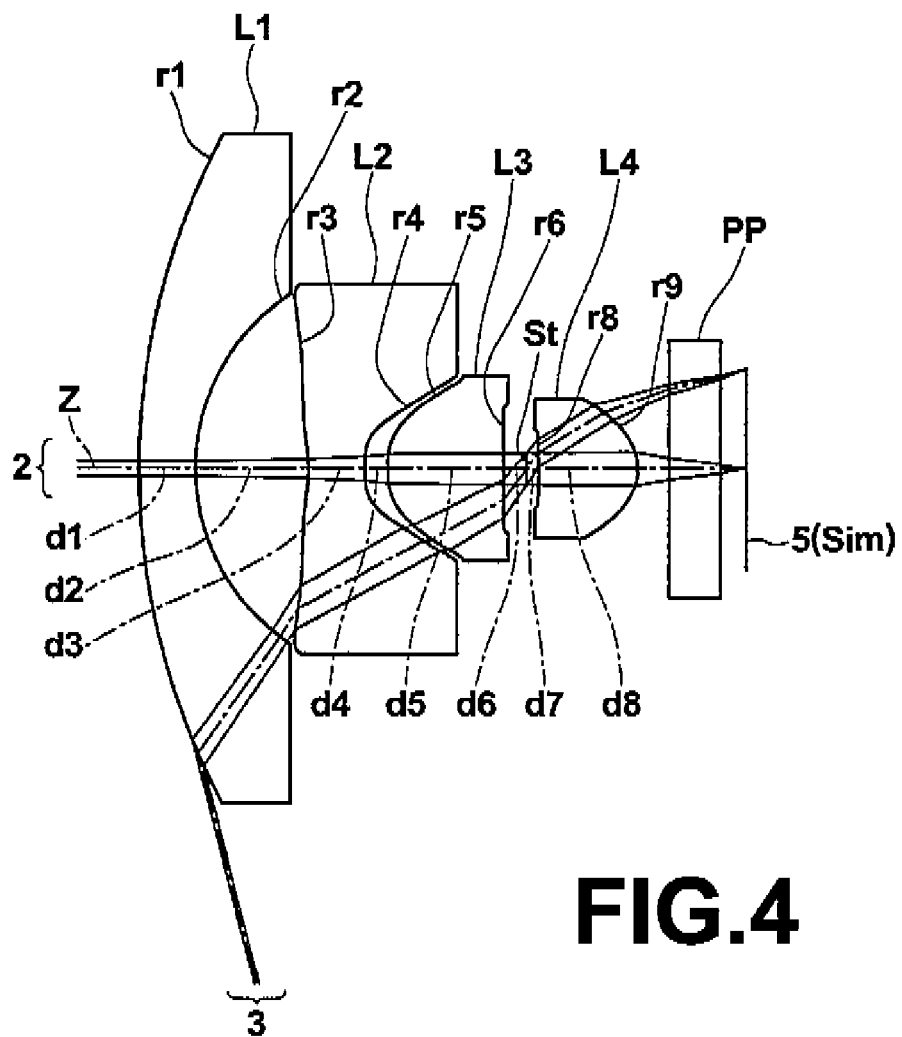
FIG. 4 is a cross-sectional view of an image pickup lens of Example 4 of the present invention, illustrating a lens configuration and an optical path thereof.
Figure 5:
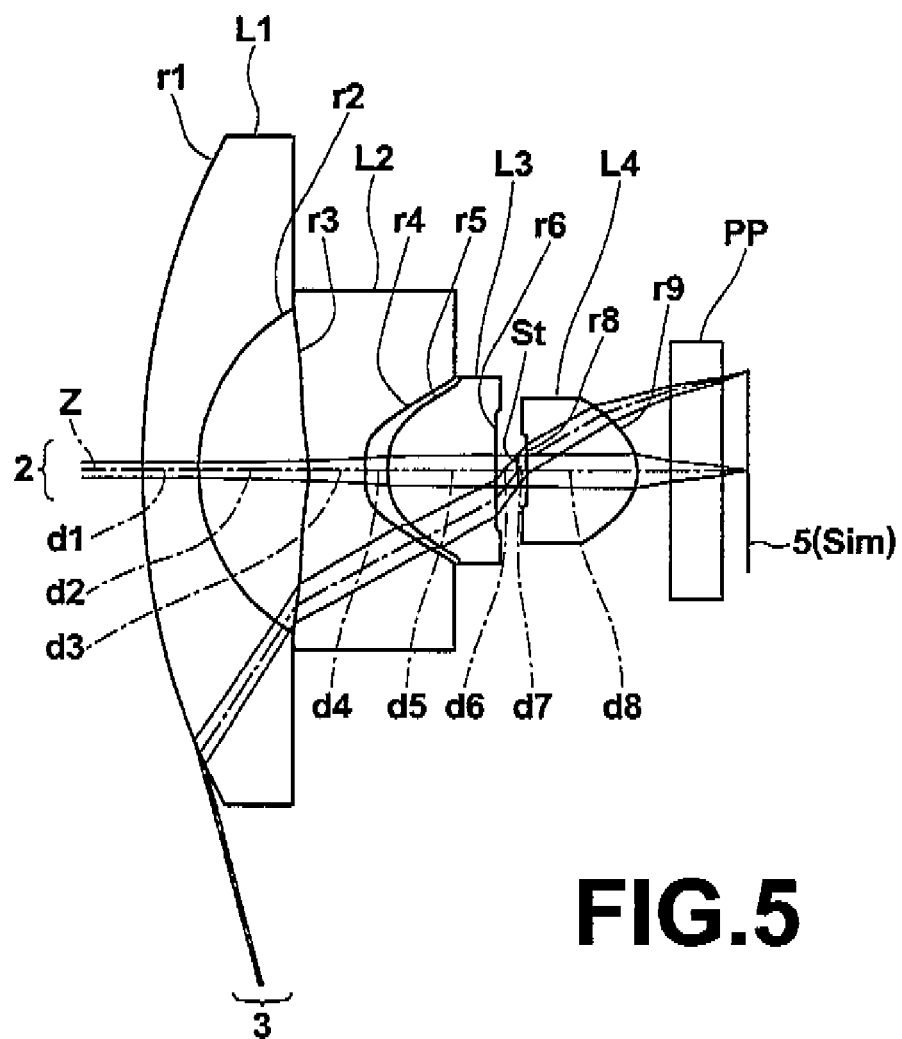
FIG. 5 is a cross-sectional view of an image pickup lens of Example 5 of the present invention, illustrating a lens configuration and an optical path thereof.
Figure 6:
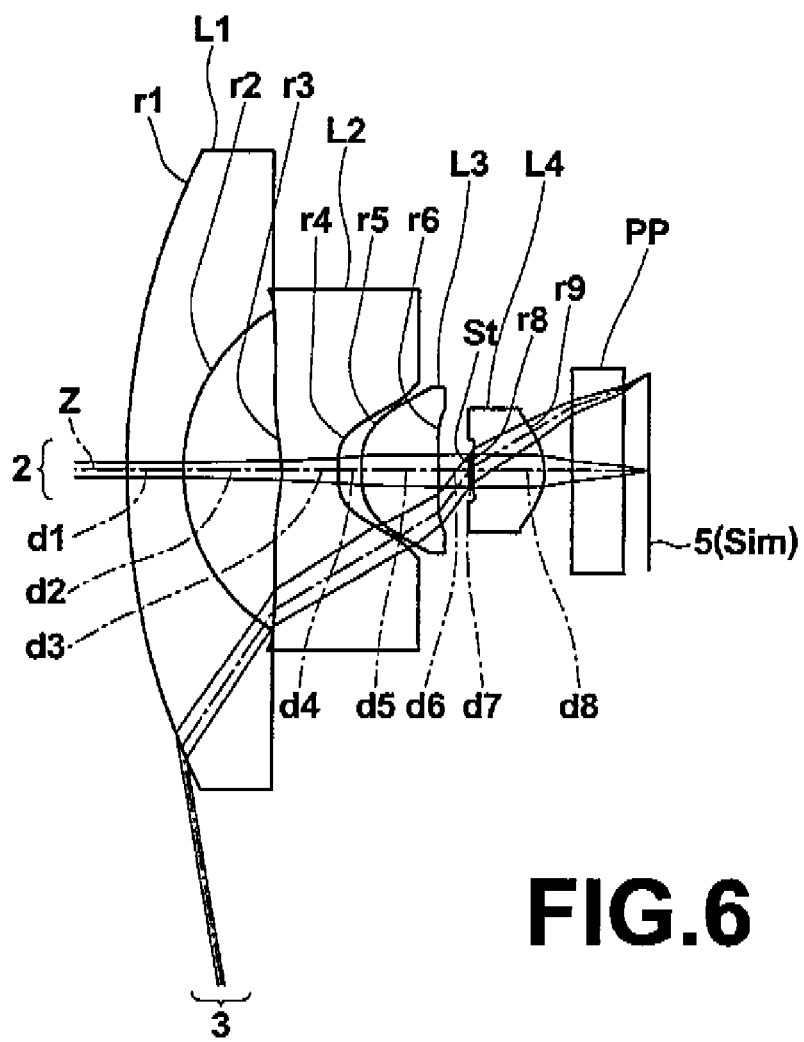
FIG. 6 is a cross-sectional view of an image pickup lens of Example 6 of the present invention, illustrating a lens configuration and an optical path thereof.
Figure 7:
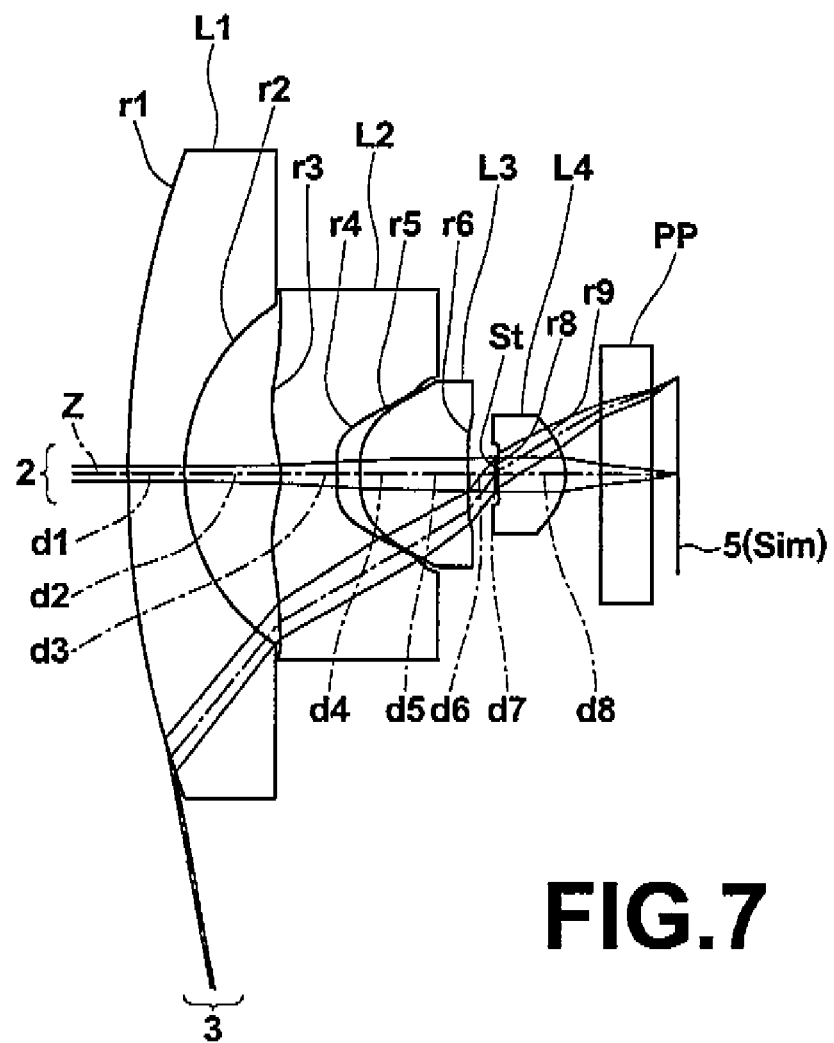
FIG. 7 is a cross-sectional view of an image pickup lens of Example 7 of the present invention, illustrating a lens configuration and an optical path thereof.
Figure 8:
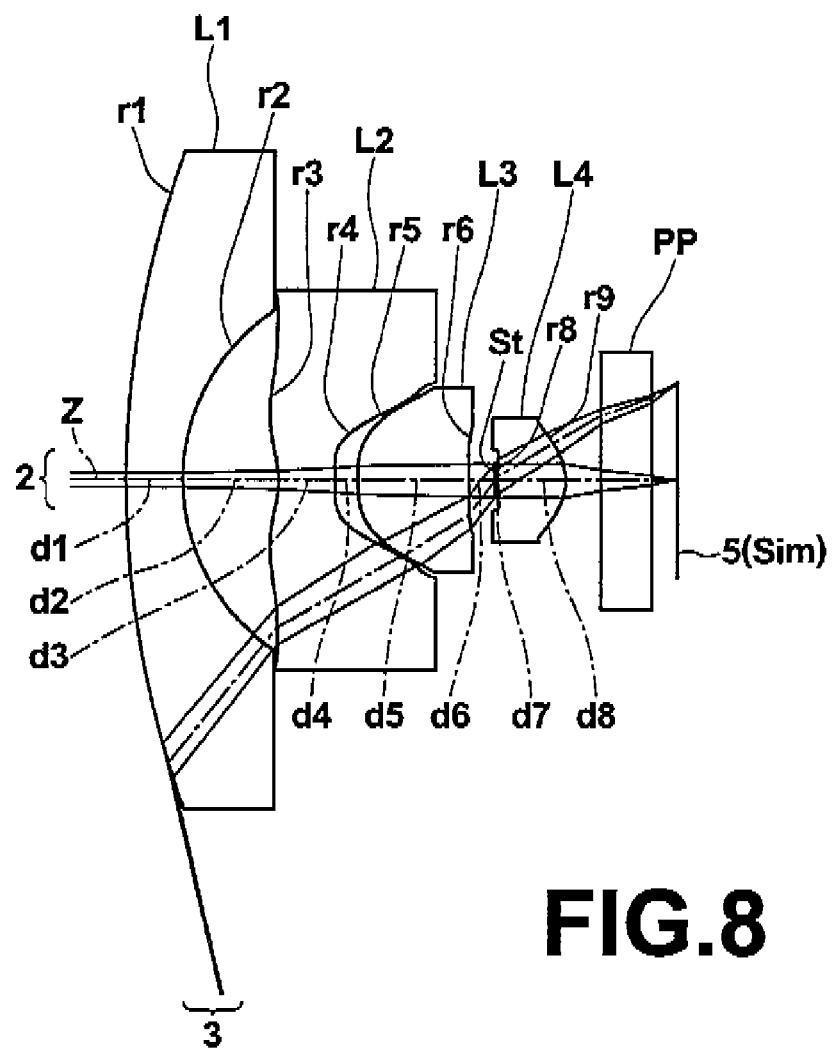
FIG. 8 is a cross-sectional view of an image pickup lens of Example 8 of the present invention, illustrating a lens configuration and an optical path thereof.

The image pickup lens shown in FIG. 1 is a lens system having four lenses disposed from the object side in the order of first lens L1, second lens L2, third lens L3, and fourth lens L4 along optical axis Z. Aperture stop St is disposed between the third lens L3 and fourth lens L4. Disposition of aperture stop St between the third lens L3 and fourth lens L4 allows downsizing of the image pickup lens in a diameter direction.

In FIG. 1, the left side is the object side and the right side is the image side. Aperture stop St is not necessarily depicted in an actual size and a shape in FIG. 1 but its position on the optical axis is indicated. In FIG. 1, reference symbol ri (i=1, 2, 3, - - - ) represents a radius of curvature of each lens surface and reference symbol di (i=1, 2, 3, - - - ) represents a surface separation. FIG. 1 further illustrates on-axis light beam 2 from an object point at an infinite distance and off-axis light beam 3 at a maximum angle of view.

Note that FIG. 1 also indicates image sensor 5 disposed on image plane Sim of image pickup lens considering the case in which image pickup lens is applied to an image pickup apparatus. When the image pickup lens is applied to an image pickup apparatus, it is preferable that a cover glass, a low-pass filter, or an infrared light cut filter is provided according to the structure of the camera on which the lens is mounted, and FIG. 1 illustrates an example case in which a parallel plate optical member PP is provided between fourth lens L4 and image sensor 5 (image plane Sim) representing the components described above.

First lens L1 is formed as a meniscus lens having a negative power and a concave surface on the image side. Formation of first lens L1 as a negative meniscus lens having a concave surface on the image side is advantageous for widening the angle of view and distortion correction. First lens L1 disposed on the most object side is expected to be exposed to wind and rain or cleaning solvents, but litter, dirt, droplet and the like concerned under such circumstances are unlikely to remain since first lens L1 has a convex surface on the object side.

In the example shown in FIG. 1, first lens L1 is a spherical lens, but an aspherical lens may also be used. However, glass is preferable to resin as the material of first lens L1 disposed on the most object side, as described later, and, therefore, first lens L1 may be produced inexpensively when formed in a spherical shape rather than formed in an aspherical shape.

Each of second lens L2, third lens L3, and fourth lens L4 has an aspherical surface on each of the object and image sides. Formation of second lens L2, third lens L3, and fourth lens L4 to have an aspherical surface on each side allows reduction of a total length of the image pickup lens in the optical axis direction and high resolution.

Second lens L2 is formed to have a negative power adjacent to the optical axis with the surface on the object side having a concave shape adjacent to the optical axis and the surface on the image side having a convex shape adjacent to the optical axis. Third lens L3 is formed to have a positive power adjacent to the optical axis with the surface on the image side having a convex shape. Third lens L3 may be formed to have a convex shape on each surface adjacent to the optical axis or in a meniscus shape having a convex surface on the image side. Fourth lens L4 is formed to have a positive power adjacent to the optical axis with the object side surface having a convex shape adjacent to the optical axis and the image side surface having a convex shape adjacent to the optical axis.

The present image pickup lens has a four element in four group structure in which the power and shape of each of first lens L1 to fourth lens L4 are set appropriately with the aperture stop St being disposed between third lens L3 and fourth lens L4 as described above. This allows the image pickup lens to be formed compact and inexpensively with less number of lenses and a reduced total length, and yet the lens has a sufficiently wide angle with various types of aberrations, including curvature of field, distortion, chromatic aberration of magnification, coma aberration and the like, being corrected appropriately. The present image pickup lens may realize high resolution over a wide range of imaging area and, therefore, may be used in conjunction with a recent image sensor having a high pixel count.

Preferably, the image pickup lenses according to embodiments of the present invention further have configurations to be described hereinafter. A preferred embodiment may have any one of the following configurations or a configuration combining any two or more of the configurations.

Preferably, the image pickup lens satisfies Conditional Expression (1) given below when a focal length of first lens L1 is taken as f1 and a focal length of the entire system is taken as f.

$$-12.0 < f1/f < -5.0 \quad (1)$$

If f1/f exceeds the upper limit of Conditional Expression (1) above, the negative power of first lens L1 is increased and absolute value of the radius of curvature of the surface of first lens L1 on the image side becomes small so that the surface becomes close to a hemispherical shape. This causes the manufacture of first lens L1 to be difficult, resulting in an increased manufacturing cost. On the other hand, if f1/f exceeds the lower limit of Conditional Expression (1), the negative power of first lens L1 is decreased. In order to compensate for this decrease, it is necessary to increase the negative power of second lens L2 resulting in the absolute value of the radius of curvature becomes small, thereby causing the manufacture of second lens L2 to be difficult with increased manufacturing cost.

Further, it is more preferable that the image pickup lens satisfies Conditional Expression (1-1) given below. By satisfying Conditional Expression (1-1), the advantageous effect obtained by satisfying Conditional Expression (1) may further be enhanced.

$$-11.0 < f1/f < -6.0 \quad (1-1)$$

It is further preferable that the image pickup lens satisfies Conditional Expression (1-2) given below. By satisfying Conditional Expression (1-2) the advantageous effect obtained by satisfying Conditional Expression (1) may still further be enhanced.

$$-10.0 < f1/f < -7.0 \quad (1-2)$$

Preferably, the image pickup lens satisfies Conditional Expression (2) given below when a distance between first lens L1 and second lens L2 on the optical axis is taken as d2 and a distance from a surface apex of the object side surface of first lens L1 to the image plane is taken as L. Note that an air equivalent length is used for a back focus portion of L.

$$0.15 < d2/L < 0.25 \quad (2)$$

If d2/L exceeds the upper limit of Conditional Expression (2), the effective radius of the image side surface of first lens L1 is increased, approaching to the radius of curvature. This causes the processing of the lens to be difficult with increased cost and the total length of the lens system in an optical axis direction to be increased. When trying to ensure an appropriate power for first lens L1 with d2/L exceeding the lower limit of Conditional Expression (2), the image side surface of first lens L1 and the object side surface of second lens L2 interfere with each other, whereby an effective radius required can not be ensured. Thus, it is difficult to realize an intended optical system of the present invention.

Further, it is more preferable that the image pickup lens satisfies Conditional Expression (2-1) given below. By satisfying Conditional Expression (2-1), the advantageous effect obtained by satisfying Conditional Expression (2) may further be enhanced.

$$0.16 < d2/L < 0.24 \quad (2-1)$$

Preferably, the image pickup lens satisfies Conditional Expression (3) given below, when a distance between second lens L2 and third lens L3 on the optical axis is taken as d4 and a distance from a surface apex of the object side surface of first lens L1 to the image plane is taken as L. Note that air equivalent length is used for a back focus portion of L.

$$0.02 < d4/L < 0.05 \tag{3}$$

If d4/L exceeds the upper limit of Conditional Expression (3), it is difficult to appropriately correct distortion while appropriately maintaining chromatic aberration of magnification, and also the total length of the lens system is increased. The image side surface of second lens L2 and the object side surface of third lens L3 are required not to contact with each other within an effective radius, and if d4/L exceeds the lower limit of Conditional Expression (3), the risk that they contact with each other is increased.

Preferably, the image pickup lens satisfies Conditional Expression (4) given below when a focal length of second lens L2 is taken as f2 and a focal length of third lens L3 is taken as f3.

$$-1.2 < f2/f3 < -0.1 \tag{4}$$

If f2/f3 exceeds the upper limit of Conditional Expression (4), distortion and chromatic aberration of magnification are increased at an intermediate angle of view. If f2/f3 exceeds the lower limit of Conditional Expression (4), correction of coma aberration becomes difficult and it is also difficult to suppress on-axis chromatic aberration to a practical level.

Further, it is more preferable that the image pickup lens satisfies Conditional Expression (4-1) given below. By satisfying Conditional Expression (4-1), the advantageous effect obtained by satisfying Conditional Expression (4) may further be enhanced.

$$-1.1 < f2/f3 < -0.3 \tag{4-1}$$

Still further, it is more preferable that the pickup lens satisfies Conditional Expression (4-2) given below. By satisfying Conditional Expression (4-2), coma aberration and on-axis chromatic aberration may be corrected more easily in comparison with the case in which Conditional Expression (4-1) is satisfied.

$$-1.1 < f2/f3 < -0.4 \tag{4-2}$$

Preferably, the image pickup lens satisfies Conditional Expression (5) given below, when a combined focal length of third lens L3 and fourth lens L4 is taken as f34 and a distance from a surface apex of the object side surface of first lens L1 to the image plane is taken as L. Note that air equivalent length is used for a back focus portion of L.

$$4.0 < L/f34 < 8.0 \tag{5}$$

If L/f34 exceeds the upper limit of Conditional Expression (5), the power of third lens L3 becomes weak and correction of chromatic aberration of magnification becomes insufficient or the power of fourth lens L3 becomes weak and correction of curvature of field and coma aberration become insufficient. In a case where L/f34 exceeds the upper limit of Conditional Expression (5) and the powers of third lens L3 and fourth lens L4 are strong, third lens L3 and fourth lens L4 are too close to dispose them appropriately, making it difficult to manufacture the image pickup lens inexpensively. If L/f34 exceeds the lower limit of Conditional Expression (5), the power of third lens L3 becomes strong and on-axis chromatic aberration becomes excessive or power of fourth lens L4 becomes strong and it is difficult to correct curvature of field and coma aberration. In a case where L/f34 exceeds the lower limit of Conditional Expression (5) and the powers of third lens L3 and fourth lens L4 are not strong, the distance between third lens L3 and fourth lens L4 becomes long and the lens system becomes large.

Further, it is more preferable that the image pickup lens satisfies Conditional Expression (5-1) given below. By satisfying Conditional Expression (5-1), the advantageous effect obtained by satisfying Conditional Expression (5) may further be enhanced.

$$4.2 < L/f34 < 6.0 \tag{5-1}$$

If third lens L3 has a convex shape on each surface adjacent to the optical axis, it is preferable that the image pickup lens satisfies Conditional Expression (6A) given below, when a radius of paraxial curvature of the image side surface of second lens L2 is taken as r4 and a radius of paraxial curvature of the object side surface of third lens L3 is taken as r5.

$$-5.0 < r5/r4 < 0.0 \tag{6A}$$

If r5/r4 exceeds the upper limit of Conditional Expression (6A), distortion and chromatic aberration of magnification are increased at an intermediate angle of field. If r5/r4 exceeds the lower limit of Conditional Expression (6A), it is difficult to appropriately correct coma aberration.

Further, it is more preferable that the image pickup lens satisfies Conditional Expression (6A-1) given below. By satisfying Conditional Expression (6A-1), the advantageous effect obtained by satisfying Conditional Expression (6A) may further be enhanced.

$$-4.0 < r5/r4 < 0.02 \tag{6A-1}$$

If third lens L3 has a meniscus shape with a convex surface on the image side, it is preferable that the image pickup lens satisfies Conditional Expression (6B) given below, when a radius of paraxial curvature of the image side surface of second lens L2 is taken as r4 and a radius of paraxial curvature of the object side surface of third lens L3 is taken as r5.

$$4.0 < r5/r4 < 8.0 \tag{6B}$$

If r5/r4 exceeds the upper limit of Conditional Expression (6B), distortion and chromatic aberration of magnification are increased at an intermediate angle of field. If r5/r4 exceeds the lower limit of Conditional Expression (6B), it is difficult to appropriately correct coma aberration.

Further, it is preferable that that the image pickup lens satisfies Conditional Expression (6B-1) given below. By satisfying Conditional Expression (6B-1), the advantageous effect obtained by satisfying Conditional Expression (6B) may further be enhanced.

$$5.0 < r5/r4 < 7.5 \tag{6B-1}$$

Still further, it is more preferable that the pickup lens satisfies Conditional Expression (6B-2) given below. By satisfying Conditional Expression (6B-2), the advantageous effect obtained by satisfying Conditional Expression (63) may further be enhanced.

$$5.5 < r5/r4 < 7.2 \tag{6B-2}$$

Preferably, the Abbe number of the material of first lens L1 with respect to d-line is not less than 40. Selection of the material in this manner allows appropriate correction of chromatic aberration of magnification. Preferably, the Abbe number of the material of second lens L2 with respect to d-line is not less than 50. Selection of the material in this manner allows appropriate correction of chromatic aberration of magnification. Preferably, the Abbe number of the material of third lens L3 with respect to d-line is not greater than 40. Selection of the material in this manner allows appropriate correction of chromatic aberration of magnification. Further, it is more preferable that the Abbe number of the material of third lens L3 with respect to d-line is not greater than 29. Selection of the material in this manner allows more appropriate correction of chromatic aberration of magnification. Preferably, the Abbe number of the material of fourth lens L4 with respect to d-line is not less than 50. Selection of the material in this manner allows appropriate and easy correction of chromatic aberration of magnification. By appropriately correcting chromatic aberration of magnification allows increased resolution, thereby making the image pickup lens appropriate for use in conjunction with a recent image sensor having a high pixel count.

Preferably, the present image pickup lens has a total angle of view of greater than 200°. The term. "total angle of view" as used herein refers to an angle between principal ray of off-axis light beam 3 and optical axis Z at a maximum angle of view multiplied by two. By making the image pickup lens of the present invention to be a wide angle lens system having a total angle of view of greater than 200°, the image pickup lens may respond to the recent demand of wider angle.

Still further, each of first to fourth lenses L1 to L4 is a single lens not cemented to each other. When the image pickup lens is expected to be used under a severe environment, such as vehicle camera or surveillance camera applications, it is preferable that the image pickup lens does not include a cemented lens. Further, the image pickup lens may be manufactured inexpensively by employing the structure that does not include a cemented lens.

When the image pickup lens of the present invention is expected to be used under a severe environment, such as vehicle camera or surveillance camera applications, it is preferable that first lens L1 disposed on the most object side is made of a material which is resistant to surface degradation by the weather, temperature change by direct sunlight, and chemicals, such as grease, detergent, and the like, that is, a material having high water resistance, weather resistance, acid resistance, chemical resistance, and the like. For example, a material with water resistance of 1 by powder method defined by Japan Optical Glass Industries Association is preferably used. Further, the material of first lens L1 may sometimes be required to be rigid and not broken easily. Use of glass may satisfy the aforementioned requirements. Alternatively, transparent ceramics may be used as the material of first lens L1.

A protection means may be provided on the object side surface of first lens L1 for improving the strength, scratch resistance, and chemical resistance. In such a case, the material of first lens L1 may be a plastic. The protection means may be a hard coating or a water-repellent coating.

Preferably, a plastic material is used as the material of second lens L2, third lens L3, and fourth lens L4. If that is the case, an aspherical surface may be formed accurately with reduced weight and cost.

Some high absorbent plastic materials may have an adverse impact on the optical performance due to changes in the refractive index and shape caused by entrance and exit of moisture. Consequently, use of extremely low absorbent materials such as a polyolefin plastic for second lens L2 and fourth lens L4, and a polycarbonate plastic or a PET plastic for third lens L3, may reduce performance degradation to a minimum due to moisture absorption.

In a case where a plastic material is used for any of second lens L2, third lens L3, and fourth lens L4, a so-called nano-composite material which is a composite of a plastic and fine particles smaller than a wavelength of light may be used.

The image pickup lens of the present invention may be provided with an antireflection film for reducing ghost light or the like. In this regard, with respect to the image side surface of first lens L1, the image side surface of second lens L2, and the object side surface of third lens L3 of the image pickup lens shown in FIG. 1, an angle formed between a tangent line at a peripheral portion of each surface and the optical axis is small, so that the thickness of the antireflection film is thinner in the peripheral portion than in a central portion. Consequently, an antireflection film whose reflectance near the central portion becomes smallest at a wavelength of 600 to 900 nm is applied on one or more of the aforementioned three surfaces, thereby averagely reducing the reflectance over the entire effective diameter to reduce ghost light.

If the wavelength that causes the reflectance to be smallest near the central portion is shorter than 600 nm, the wavelength that causes the reflectance to be smallest at the peripheral portion becomes too short, causing the reflectance on the long wavelength side to be increased and reddish ghost to be likely to occur. While if the wavelength that causes the reflectance to be smallest near the central portion is longer than 900 nm, the wavelength that causes the reflectance to be smallest at the central portion becomes too long, causing the reflectance on the short wavelength side to be increased. This causes the image color to appreciably become reddish and bluish ghost to be likely to occur.

A light beam passing through outside of the effective diameter of each lens possibly reaches the image plane as stray light and generates ghost. Therefore, in the image pickup lens of the present invention, it is preferable that a light blocking means for blocking the stray light is provided as required. As for the light blocking means, for example, an opaque coating material may be applied or an opaque plate may be provided on a portion of the image side surface of each lens outside of the effective diameter. Alternatively, an opaque plate may be provided in the optical path of a light beam that becomes stray light as the light blocking means.

Depending on the application of the image pickup lens, a filter that cuts ultraviolet to blue light or an IR (infrared) cut filter that cuts infrared light may be inserted between the lens system and image sensor 5. Alternatively, a coating having a characteristic identical to that of the filter described above may be applied on a lens surface.

FIG. 1 illustrates an example case in which an optical member PP, representing various types of filters, is disposed between the lens system and image sensor 5. Instead of this, each of the various types of filters may be disposed between each of the lenses. Alternatively, a coating that acts as the various types of filters may be applied on a lens surface of any of the lenses of the image pickup lens.

Numerical examples of image pickup lenses of the present invention will now be described. Cross-sectional views of the image pickup lenses of Examples 1 to 8 are those illustrated in FIGS. 1 to 8 respectively.

Lens data of the image pickup lens of Example 1 are shown in Table 1 and aspherical surface data are shown in Table 2. Likewise, lens data of the image pickup lenses of Examples 2 to Examples 8 and aspherical surface data are shown in Tables 3 to 16 respectively. Hereinafter, symbols in the tables will be described by taking Example 1 as example, but symbols in Examples 2 to 8 are basically identical to those of Example 1.

In the lens data of Table 1, si column represents $i^{th}$ (i=1, 2, 3, - - - ) surface number, which is gradually incremented toward image side with the surface of the component disposed on the most object side being taken as the first surface. The ri column represents a radius of curvature of $i^{th}$ surface and the di column represents a surface separation between $i^{th}$ surface and $i^{th}$+1 surface. The positive sign of radius of curvature indicates that the surface is convex on the object side and that negative sign of radius of curvature indicates that the surface is convex on the image side. In each example, the symbols ri and di (i=1, 2, 3, - - - ) correspond respectively to the symbols ri and di in the cross-sectional view of the lenses.

Further, in the lens data of Table 1, Nej column represents a refractive index (wavelength of 546.07 nm) of $j^{th}$ lens (j=1, 2, 3, - - - ) with respect to e-line, which is gradually incremented toward the image side with the lens disposed at the most object side being taken as the first lens. The vdj column represents an Abbe number of $j^{th}$ optical element with respect to d-line (wavelength of 587.6 nm). The lens data shown in Table 1 include aperture stop St and the radius of curvature field corresponding to the aperture stop St includes "∞ (Aperture Stop)".

The optical element PP disposed between fourth lens L4 and image plane Sim in FIGS. 1 to 8 is an assumed cover glass, filter, or the like, and a 1 mm thick glass material with a refractive index of 1.52 is used in each of Examples 1 to 8.

In the les data of Table 1, the surface number of each aspherical surface is preceded by * mark and a value of radius of curvature adjacent to the optical axis (paraxial radius of curvature) is indicated as the radius of curvature of the aspherical surface. Aspherical surface data in Table 2 include the surface number and an aspherical coefficient of each aspherical surface. In the aspherical surface data of Table 2, a numerical value "E-n" (n: an integer) refers to "×10$^{-n}$" and "E+n" refers to "×10". The aspherical surface coefficients represent values of each of coefficients K and Bm (m=3, 4, 5, - - - , 20) in the aspherical surface equation given below.

$$Zd = C \cdot h^2 / \{1 + (1 - K \cdot C^2 \cdot h^2)^{1/2}\} + \Sigma Bm \cdot h^m$$

where,

Zd: depth of aspherical surface (a length of the vertical line from a point on the aspherical surface at height h to a flat surface orthogonal to an optical axis to which the aspherical vertex contact), h: height (distance from the optical axis to lens surface), C: inverse of paraxial radius of curvature, and K, Bm: aspherical coefficient (m=3, 4, 5, - - - , 20).

TABLE 1

Example 1 Lens Data

| si | ri | di | Nej | vdj |
|---|---|---|---|---|
| 1 | 14.6770 | 1.2000 | 1.77620 | 49.6 |
| 2 | 4.0484 | 2.5072 | | |
| *3 | −1.2226 | 1.1000 | 1.53341 | 55.4 |
| *4 | −16.2573 | 0.4439 | | |
| *5 | 2.9517 | 2.1100 | 1.61965 | 25.5 |
| *6 | −8.6594 | 0.4301 | | |
| 7 | ∞(Aperture Stop) | 0.2583 | | |
| *8 | 11.4724 | 1.5978 | 1.53341 | 55.4 |
| *9 | −1.0494 | | | |

TABLE 2

Example 1 Aspherical Surface Data

| si | 3 | 4 | 5 | 6 | 8 | 9 |
|---|---|---|---|---|---|---|
| K | 0 | 0 | 0 | 0 | 0 | 0 |
| B3 | 3.43295E−01 | 7.28296E−01 | 3.04161E−01 | 2.73701E−02 | 8.89421E−02 | 9.90101E−02 |
| B4 | −9.78649E−02 | −5.32331E−01 | −2.73038E−01 | 1.56332E−01 | −1.23040E+00 | −8.75626E−01 |
| B5 | 8.70702E−03 | 3.77955E−01 | 2.70846E−01 | −3.38766E−01 | 2.68430E+00 | 2.82533E+00 |
| B6 | −5.60430E−04 | 2.84719E−01 | 3.99010E−02 | 8.59187E−02 | 1.68284E+01 | −4.02792E+00 |
| B7 | −2.99867E−03 | −1.92696E−01 | −3.58624E−01 | 5.41637E−01 | −1.15965E+02 | 1.60063E+00 |
| B8 | 1.43484E−03 | −2.36531E−01 | 3.05399E−01 | −4.28278E−01 | 2.59907E+02 | 9.17438E−01 |
| B9 | 1.11984E−04 | −2.96579E−02 | −9.97328E−02 | −8.97063E−02 | −2.60492E+02 | 1.26086E+00 |
| B10 | −4.57905E−05 | 8.20296E−02 | 3.18463E−02 | −1.88562E−01 | 3.58071E+02 | −1.23462E+00 |
| B11 | −1.22159E−05 | 5.75094E−02 | −2.79721E−02 | 1.80257E−01 | 1.03360E+02 | −4.79850E+00 |
| B12 | −2.94983E−06 | −1.45946E−02 | 4.44773E−03 | 5.87518E−01 | −5.36953E+03 | 6.01088E+00 |
| B13 | −1.40611E−06 | 1.12291E−02 | −4.90633E−03 | −3.67626E−01 | 1.21601E+04 | −1.28388E+00 |
| B14 | 8.90612E−07 | −9.70787E−03 | 4.67031E−03 | −1.68450E−01 | −4.83741E+03 | −5.21086E−02 |
| B15 | −4.16410E−08 | −4.92171E−03 | 3.26695E−03 | 2.07888E−02 | −4.44322E+02 | −7.06317E−01 |
| B16 | 3.31963E−08 | −2.40220E−03 | 1.48792E−03 | −5.75812E−02 | −2.67280E+04 | −3.40115E−02 |
| B17 | 3.00186E−09 | 1.09998E−03 | −2.27945E−03 | −1.92509E−01 | 2.74233E+04 | 3.52817E−01 |
| B18 | −4.33895E−09 | 9.07064E−04 | 1.07266E−04 | 3.67908E−01 | 4.17662E+04 | −5.07256E−02 |
| B19 | −6.35606E−10 | 6.17705E−04 | −5.93021E−04 | 2.78838E−01 | −7.45945E+04 | 9.06835E−03 |
| B20 | 2.36427E−10 | −3.70408E−04 | 3.58924E−04 | −1.08045E−01 | 3.03371E+04 | −1.82203E−02 |

TABLE 3

Example 2 Lens Data

| si | ri | di | Nej | vdj |
|---|---|---|---|---|
| 1 | 14.2808 | 1.1000 | 1.77620 | 49.6 |
| 2 | 4.0261 | 2.5809 | | |
| *3 | −1.3404 | 1.1000 | 1.53340 | 55.4 |
| *4 | −41.2413 | 0.4439 | | |
| *5 | 2.9699 | 2.0426 | 1.61965 | 25.5 |
| *6 | −8.3166 | 0.4117 | | |
| 7 | ∞(Aperture Stop) | 0.2733 | | |
| *8 | 30.5099 | 1.6279 | 1.53340 | 55.4 |
| *9 | −0.9705 | | | |

TABLE 4

Example 2 Aspherical Surface Data

| si | 3 | 4 | 5 | 6 | 8 | 9 |
|---|---|---|---|---|---|---|
| K | 0 | 0 | 0 | 0 | 0 | 0 |
| B3 | 3.33570E−01 | 7.31490E−01 | 3.34294E−01 | 1.90033E−02 | 1.19652E−01 | 1.06413E−01 |
| B4 | −9.83453E−02 | −5.08833E−01 | −3.19687E−01 | 1.86217E−01 | −1.34680E+00 | −8.90215E−01 |

TABLE 4-continued

Example 2 Aspherical Surface Data

| si | 3 | 4 | 5 | 6 | 8 | 9 |
|---|---|---|---|---|---|---|
| B5 | 8.63131E−03 | 3.79770E−01 | 3.17482E−01 | −3.53576E−01 | 2.51179E+00 | 2.85230E+00 |
| B6 | −5.45666E−04 | 2.85766E−01 | 3.20584E−02 | 7.70796E−02 | 1.74860E+01 | −4.10034E+00 |
| B7 | −2.98053E−03 | −1.89737E−01 | −3.55659E−01 | 5.11420E−01 | −1.15878E+02 | 1.64776E+00 |
| B8 | 1.43857E−03 | −2.40832E−01 | 3.06128E−01 | −4.10396E−01 | 2.56728E+02 | 9.19673E−01 |
| B9 | 1.12224E−04 | −3.23068E−02 | −1.02942E−01 | −7.11653E−02 | −2.50056E+02 | 1.25999E+00 |
| B10 | −4.54416E−05 | 8.17282E−02 | 3.19689E−02 | −3.37841E−01 | 3.45578E+02 | −1.23668E+00 |
| B11 | −1.22838E−05 | 5.70030E−02 | −2.82553E−02 | 3.71833E−01 | 4.35775E+01 | −4.79543E+00 |
| B12 | −2.95927E−06 | −1.40622E−02 | 4.19182E−03 | 5.58673E−01 | −5.16246E+03 | 5.98199E+00 |
| B13 | −1.40839E−06 | 1.08576E−02 | −5.63791E−03 | −3.32209E−01 | 1.20155E+04 | −1.27982E+00 |
| B14 | 8.91248E−07 | −9.52693E−03 | 4.95716E−03 | −1.64710E−01 | −4.91170E+03 | −4.77247E−02 |
| B15 | −4.37492E−08 | −4.98453E−03 | 3.52898E−03 | −3.80380E−02 | −7.33789E+02 | −7.04569E−01 |
| B16 | 3.33282E−08 | −1.87038E−03 | 1.56840E−03 | −9.41914E−02 | −2.60044E+04 | −1.56526E−02 |
| B17 | 2.98080E−09 | 8.18598E−04 | −2.37055E−03 | −1.76510E−01 | 2.74933E+04 | 3.49044E−01 |
| B18 | −4.32151E−09 | 8.86584E−04 | 1.08380E−04 | 3.70926E−01 | 4.10152E+04 | −5.91671E−02 |
| B19 | −6.20097E−10 | 6.31574E−04 | −5.87375E−04 | 5.82457E−02 | −7.44402E+04 | 3.93810E−03 |
| B20 | 2.33163E−10 | −3.67730E−04 | 3.58905E−04 | −1.23027E−01 | 3.05126E+04 | −1.33590E−02 |

TABLE 5

Example 3 Lens Data

| si | ri | di | Nej | νdj |
|---|---|---|---|---|
| 1 | 14.6070 | 1.1000 | 1.77620 | 49.6 |
| 2 | 3.9590 | 2.0921 | | |
| *3 | −1.8773 | 1.1000 | 1.53340 | 55.4 |
| *4 | −140.0089 | 0.4439 | | |
| *5 | 5.7330 | 2.0716 | 1.61965 | 25.5 |
| *6 | −16.5798 | 0.5340 | | |
| 7 | ∞(Aperture Stop) | 0.2310 | | |
| *8 | 110.9665 | 1.5594 | 1.53340 | 55.4 |
| *9 | −1.0191 | | | |

TABLE 7

Example 4 Lens Data

| si | ri | di | Nej | νdj |
|---|---|---|---|---|
| 1 | 13.8535 | 1.1000 | 1.88814 | 49.6 |
| 2 | 4.0511 | 2.1998 | | |
| *3 | −1.8400 | 1.1000 | 1.53340 | 55.4 |
| *4 | −4.6411 | 0.4439 | | |
| *5 | 6.3349 | 2.2439 | 1.61965 | 25.5 |
| *6 | −9.1102 | 0.4450 | | |
| 7 | ∞(Aperture Stop) | 0.2309 | | |
| *8 | 34.3949 | 1.9356 | 1.53340 | 55.4 |
| *9 | −0.9002 | | | |

TABLE 6

Example 3 Aspherical Surface Data

| si | 3 | 4 | 5 | 6 | 8 | 9 |
|---|---|---|---|---|---|---|
| K | 0 | 0 | 0 | 0 | 0 | 0 |
| B3 | 2.85671E−01 | 6.92962E−01 | 3.15450E−01 | 1.63846E−02 | 1.52996E−01 | 7.11765E−02 |
| B4 | −8.53337E−02 | −2.14312E−01 | −2.45522E−02 | 1.65871E−01 | −2.12702E+00 | −3.47624E−01 |
| B5 | 2.78549E−03 | 3.71450E−02 | −1.89487E−01 | −2.35314E−01 | 9.61093E+00 | 6.56037E−01 |
| B6 | −7.69191E−04 | 1.89918E−01 | 1.99201E−01 | 3.54453E−02 | −9.75058E+00 | −5.30104E−01 |
| B7 | −2.06187E−03 | −1.86167E−02 | 2.06705E−02 | 4.04705E−01 | −6.92205E+00 | 2.59025E−02 |
| B8 | 1.38402E−03 | −1.77961E−01 | −6.92218E−02 | −2.15907E−01 | 2.14113E+02 | −1.30307E−02 |
| B9 | 4.35651E−05 | −2.93481E−02 | −6.31861E−03 | −1.58792E−01 | −1.35133E+02 | 4.58319E−01 |
| B10 | −5.20230E−05 | 4.55048E−02 | 1.25152E−02 | −3.54278E−01 | 1.12882E+02 | −6.59700E−01 |
| B11 | −5.46681E−06 | 3.11194E−02 | 1.02201E−03 | 2.41688E−01 | −1.89615E+02 | 2.90581E−01 |
| B12 | −2.13599E−06 | −1.07792E−03 | 9.11130E−04 | 5.82157E−01 | −4.40495E+03 | 1.83467E−01 |
| B13 | −1.01137E−06 | −4.88210E−03 | −3.65568E−03 | −4.10333E−01 | 1.30280E+04 | −1.06785E−01 |
| B14 | 5.29283E−07 | −9.49480E−04 | −2.45682E−04 | −6.05553E−02 | −7.33513E+03 | −9.26351E−02 |
| B15 | −1.01048E−08 | −1.42430E−03 | 1.24669E−03 | 3.03635E−01 | −2.35749E+03 | −8.04560E−02 |
| B16 | 2.29263E−08 | 3.39654E−04 | 1.80187E−03 | −1.92363E−01 | −2.31149E+04 | 1.27695E−01 |
| B17 | 3.77051E−09 | −2.09821E−04 | −1.07780E−03 | −4.03585E−01 | 3.24004E+04 | 4.03454E−02 |
| B18 | −2.91382E−09 | −7.59384E−05 | 1.11293E−04 | 3.21327E−01 | 3.42609E+04 | −7.82695E−02 |
| B19 | −5.72710E−10 | 3.60345E−04 | −3.88815E−04 | 1.41783E−01 | −7.48174E+04 | 2.83022E−02 |
| B20 | 1.67573E−10 | −1.12086E−04 | 1.79774E−04 | −1.13676E−01 | 3.25371E+04 | −4.11356E−03 |

TABLE 8

Example 4 Aspherical Surface Data

| si  | 3 | 4 | 5 | 6 | 8 | 9 |
|---|---|---|---|---|---|---|
| K   | 0 | 0 | 0 | 0 | 0 | 0 |
| B3  | 2.47951E−01 | 7.93636E−01 | 3.91351E−01 | 2.21723E−02 | −3.01168E−01 | 1.66220E−01 |
| B4  | −7.39826E−02 | −2.25089E−01 | 3.40635E−02 | 1.12374E−01 | 2.65852E+00 | −6.04236E−01 |
| B5  | 6.74033E−03 | 6.22582E−02 | −3.07519E−01 | −1.84084E−01 | −1.19286E+01 | 8.61562E−01 |
| B6  | −1.31146E−03 | 9.03942E−02 | 2.10887E−01 | 1.34857E−01 | 1.48219E+01 | −3.98184E−01 |
| B7  | −2.55385E−04 | −3.67429E−02 | 1.91756E−02 | 1.15388E−01 | 2.38041E+01 | 2.66167E−02 |
| B8  | 2.68676E−04 | −5.58215E−02 | −1.73697E−02 | −9.97842E−02 | 3.83923E+01 | −2.05684E−01 |
| B9  | −8.90087E−06 | −3.92115E−02 | −3.68984E−02 | −2.68615E−01 | −4.91437E+02 | 8.95633E−02 |
| B10 | 3.50222E−06 | 2.48189E−02 | 6.55019E−03 | −4.13079E−02 | 6.69926E+02 | 1.60416E−01 |
| B11 | 1.17506E−06 | 8.94667E−03 | 3.35673E−03 | 2.28705E−01 | 4.42259E+02 | −8.60353E−02 |
| B12 | −9.74378E−07 | 3.49260E−04 | 3.34033E−03 | 4.36166E−01 | −2.02482E+03 | −4.13729E−03 |
| B13 | −1.27509E−07 | 7.76717E−04 | 8.46577E−04 | −4.07643E−01 | 4.68042E+03 | 4.43720E−03 |
| B14 | −3.15050E−08 | −3.08013E−04 | −8.62789E−04 | −1.63429E−01 | −4.43029E+03 | −6.61971E−02 |
| B15 | −2.50152E−09 | 3.93557E−06 | −8.89477E−04 | 3.44362E−01 | −1.02437E+04 | 9.04846E−03 |
| B16 | 6.61463E−09 | −2.66204E−05 | 7.41710E−06 | −2.17580E−01 | 1.95093E+04 | 2.42353E−02 |
| B17 | 2.20552E−09 | −4.77324E−04 | 5.95476E−05 | −1.07255E−01 | −5.79614E+03 | −1.34318E−02 |
| B18 | 4.96175E−12 | 2.76939E−05 | 1.27562E−04 | 1.14250E−01 | 1.80880E+04 | −5.20539E−04 |
| B19 | −5.13132E−10 | 1.27422E−04 | 7.58839E−05 | 8.58556E−02 | −4.61691E+04 | 6.54850E−03 |
| B20 | 9.13414E−11 | −2.40697E−05 | −5.81432E−05 | −5.92930E−02 | 2.61510E+04 | −2.74360E−03 |

TABLE 9

Example 5 Lens Data

| si | ri | di | Nej | vdj |
|---|---|---|---|---|
| 1 | 13.9364 | 1.1000 | 1.77620 | 49.6 |
| 2 | 3.6321 | 2.1256 | | |
| *3 | −1.7446 | 1.1000 | 1.53340 | 55.4 |
| *4 | −3.2420 | 0.4439 | | |
| *5 | 8.4795 | 2.1063 | 1.61965 | 25.5 |
| *6 | −13.8563 | 0.4223 | | |
| 7 | ∞(Aperture Stop) | 0.1780 | | |
| *8 | 20.0749 | 2.1437 | 1.53340 | 55.4 |
| *9 | −0.9002 | | | |

TABLE 11

Example 6 Lens Data

| si | ri | di | Nej | vdj |
|---|---|---|---|---|
| 1 | 13.9364 | 1.1000 | 1.77620 | 49.6 |
| 2 | 3.6321 | 1.9187 | | |
| *3 | −1.6747 | 1.1000 | 1.53340 | 55.4 |
| *4 | −3.0406 | 0.4439 | | |
| *5 | −18.2308 | 1.5000 | 1.61965 | 25.5 |
| *6 | −5.1204 | 0.6028 | | |
| 7 | ∞(Aperture Stop) | 0.0572 | | |
| *8 | 3.6093 | 1.3971 | 1.53340 | 55.4 |
| *9 | −1.0769 | | | |

TABLE 10

Example 5 Aspherical Surface Data

| si  | 3 | 4 | 5 | 6 | 8 | 9 |
|---|---|---|---|---|---|---|
| K   | 0 | 0 | 0 | 0 | 0 | 0 |
| B3  | 2.46877E−01 | 7.83901E−01 | 4.19933E−01 | 2.64421E−02 | −3.23146E−01 | 2.01514E−01 |
| B4  | −7.26105E−02 | −1.73320E−01 | 2.93796E−02 | 1.16150E−01 | 2.88625E+00 | −6.97843E−01 |
| B5  | 7.05188E−03 | 4.82736E−02 | −3.08134E−01 | −1.98264E−01 | −1.31858E+01 | 9.22392E−01 |
| B6  | −1.34442E−03 | 7.64738E−02 | 2.14216E−01 | 1.22965E−01 | 1.74418E+01 | −3.33817E−01 |
| B7  | −2.69179E−04 | −4.28806E−02 | 1.15872E−02 | 1.16584E−01 | 2.64518E+01 | −6.56894E−02 |
| B8  | 2.65099E−04 | −5.37972E−02 | −1.69367E−02 | −6.88641E−02 | 4.56410E+01 | −1.82390E−01 |
| B9  | −9.89305E−06 | −3.67931E−02 | −3.69744E−02 | −3.00358E−01 | −5.52301E+02 | 9.92572E−02 |
| B10 | 3.25044E−06 | 2.70183E−02 | 7.60740E−03 | −2.78677E−02 | 4.68560E+02 | 1.70591E−01 |
| B11 | 1.50832E−06 | 8.49271E−03 | 3.99495E−03 | 2.24025E−01 | 9.96175E+02 | −6.74609E−02 |
| B12 | −9.07979E−07 | 1.41424E−03 | 3.13330E−03 | 4.29678E−01 | −1.75874E+02 | −1.01153E−02 |
| B13 | −1.32024E−07 | −3.81721E−04 | 1.01323E−03 | −3.94605E−01 | −1.22185E+02 | −1.57549E−02 |
| B14 | −3.52506E−08 | −7.21754E−05 | −9.09443E−04 | −1.63634E−01 | −2.66072E+03 | −2.94428E−02 |
| B15 | −3.83857E−09 | −2.76857E−05 | −8.22372E−04 | 3.30412E−01 | −1.53693E+04 | 1.37370E−02 |
| B16 | 5.44391E−09 | −1.23784E−04 | −1.34055E−04 | −2.11173E−01 | 2.16469E+04 | 2.62003E−02 |
| B17 | 2.46679E−09 | −3.78068E−04 | 6.93720E−05 | −1.01569E−01 | 3.39282E+04 | −1.52445E−02 |
| B18 | −1.10011E−11 | 9.73669E−05 | 1.28350E−04 | 1.03696E−01 | −9.60204E+03 | 2.71544E−03 |
| B19 | −5.07758E−10 | 1.56157E−05 | 7.66940E−05 | 8.89116E−02 | −1.06124E+05 | −9.77084E−04 |
| B20 | 9.40593E−11 | 9.18901E−06 | −5.47674E−05 | −5.54801E−02 | 8.07079E+04 | 1.65684E−04 |

TABLE 12

| | Example 6 Aspherical Surface Data | | | | | |
|---|---|---|---|---|---|---|
| si | 3 | 4 | 5 | 6 | 8 | 9 |
| K | 0 | 0 | 0 | 0 | 0 | 0 |
| B3 | 2.52736E−01 | 7.95669E−01 | 5.69772E−01 | 1.18387E−01 | −1.77050E−01 | 2.26025E−01 |
| B4 | −7.02922E−02 | −8.30161E−02 | −5.72587E−02 | 8.90837E−02 | 2.46704E+00 | −9.08215E−01 |
| B5 | 7.60268E−03 | 9.30539E−02 | −3.20389E−01 | −2.39747E−01 | −1.31581E+01 | 1.39131E+00 |
| B6 | −1.38280E−03 | 2.30522E−02 | 2.34630E−01 | 1.57563E−01 | 1.86852E+01 | −4.56479E−01 |
| B7 | −3.07335E−04 | −3.29903E−02 | 2.84172E−02 | 1.49169E−01 | 3.17230E+01 | −2.28023E−01 |
| B8 | 2.53464E−04 | −7.84195E−02 | −1.60673E−02 | −2.51270E−03 | 3.59051E+01 | −2.70178E−01 |
| B9 | −1.43721E−05 | −1.17545E−02 | −3.89972E−02 | −2.77270E−01 | −5.70229E+02 | 1.59393E−01 |
| B10 | −4.26610E−07 | 2.77576E−02 | 2.89089E−03 | −1.65293E−01 | 4.38432E+02 | 2.71349E−01 |
| B11 | 1.48539E−06 | −9.70726E−06 | 6.98253E−03 | 3.40228E−01 | 1.23849E+03 | 4.90114E−02 |
| B12 | −5.80385E−07 | 1.67504E−04 | 3.50574E−03 | 3.62878E−01 | −1.23741E+02 | −3.86469E−02 |
| B13 | −1.11525E−07 | −1.17825E−04 | 3.39266E−05 | −4.26406E−01 | −1.44797E+03 | −7.87345E−02 |
| B14 | −3.11264E−08 | −1.22839E−04 | −9.76987E−04 | −1.58022E−01 | −4.26434E+03 | −7.12486E−02 |
| B15 | −5.36088E−10 | −9.95548E−05 | −7.24161E−04 | 3.71372E−01 | −2.44421E+03 | −3.73169E−02 |
| B16 | 6.19375E−09 | −5.95826E−05 | −1.72384E−04 | −1.72999E−01 | 3.97231E+03 | −3.19576E−03 |
| B17 | 2.56661E−09 | −5.88284E−06 | 7.76195E−05 | −1.15243E−01 | 4.90443E+04 | 2.50949E−02 |
| B18 | −5.68227E−11 | 1.59735E−05 | 1.22487E−04 | 7.92883E−02 | −1.02677E+04 | 5.25043E−02 |
| B19 | −5.37297E−10 | 1.75314E−05 | 5.74794E−05 | 7.45992E−02 | −1.61194E+05 | 2.09098E−02 |
| B20 | 8.84899E−11 | −5.70999E−06 | −3.76576E−05 | −4.45220E−02 | 1.36354E+05 | −3.07445E−02 |

TABLE 13

| | Example 7 Lens Data | | | |
|---|---|---|---|---|
| si | ri | di | Nej | vdj |
| 1 | 18.4473 | 1.1000 | 1.77620 | 49.6 |
| 2 | 3.9615 | 1.8653 | | |
| *3 | −1.2096 | 1.1000 | 1.53340 | 55.4 |
| *4 | −1.7525 | 0.4439 | | |
| *5 | −12.3671 | 2.1031 | 1.61965 | 25.5 |
| *6 | −10.7252 | 0.5257 | | |
| 7 | ∞(Aperature Stop) | 0.0500 | | |
| *8 | 5.0035 | 1.3193 | 1.53340 | 55.4 |
| *9 | −1.0331 | | | |

TABLE 15

| | Example 8 Lens Data | | | |
|---|---|---|---|---|
| si | ri | di | Nej | vdj |
| 1 | 18.6535 | 1.1000 | 1.77620 | 49.6 |
| 2 | 3.9438 | 1.8673 | | |
| *3 | −1.2104 | 1.1000 | 1.53340 | 55.4 |
| *4 | −1.7265 | 0.4439 | | |
| *5 | −11.1414 | 2.1487 | 1.61965 | 25.5 |
| *6 | −10.7456 | 0.5063 | | |
| 7 | ∞(Aperature Stop) | 0.0500 | | |
| *8 | 5.0319 | 1.3221 | 1.53340 | 55.4 |
| *9 | −1.0267 | | | |

TABLE 14

| | Example 7 Aspherical Surface Data | | | | | |
|---|---|---|---|---|---|---|
| si | 3 | 4 | 5 | 6 | 8 | 9 |
| K | 0 | 0 | 0 | 0 | 0 | 0 |
| B3 | 3.32027E−01 | 7.75963E−01 | 4.24749E−01 | 2.70016E−02 | −3.45442E−01 | 5.50143E−02 |
| B4 | −6.96190E−02 | −2.16125E−01 | 1.10050E−01 | 1.65996E−01 | 3.41899E+00 | −2.09418E−01 |
| B5 | 1.75275E−03 | 1.65536E−01 | −4.07638E−01 | −2.91603E−01 | −1.41671E+01 | 3.55090E−01 |
| B6 | −8.14096E−04 | 5.05057E−02 | 1.59458E−01 | 2.19788E−01 | 1.49568E+01 | −5.72578E−02 |
| B7 | −3.99266E−04 | −1.09776E−02 | 1.02911E−01 | 1.40183E−01 | 3.57605E+01 | −4.39958E−02 |
| B8 | 2.62738E−04 | −6.61244E−02 | −2.16118E−02 | 1.12653E−03 | 2.91458E+01 | −4.13295E−01 |
| B9 | −1.04083E−05 | −1.95800E−02 | −4.21726E−02 | −2.97760E−01 | −4.97629E+02 | 2.48471E−01 |
| B10 | 4.39013E−07 | 2.32084E−02 | 2.67108E−03 | −1.71171E−01 | 3.38004E+02 | 2.15740E−01 |
| B11 | 1.48539E−06 | −9.70726E−06 | 6.98253E−03 | 3.40228E−01 | 1.23849E+03 | 4.90114E−02 |
| B12 | −5.80385E−07 | 1.67504E−04 | 3.50574E−03 | 3.62878E−01 | −1.23741E+02 | −3.86469E−02 |
| B13 | −1.11525E−07 | −1.17825E−04 | 3.39266E−05 | −4.26406E−01 | −1.44797E+03 | −7.87345E−02 |
| B14 | −3.11264E−08 | −1.22839E−04 | −9.76987E−04 | −1.53022E−01 | −4.26434E+03 | −7.12486E−02 |
| B15 | −5.36088E−10 | −9.95548E−05 | −7.24161E−04 | 3.71372E−01 | −2.44421E+03 | −3.73169E−02 |
| B16 | 6.19375E−09 | −5.95826E−05 | −1.72384E−04 | −1.72999E−01 | 3.97231E+03 | −3.19576E−03 |
| B17 | 2.56661E−09 | −5.88284E−06 | 7.76195E−05 | −1.15243E−01 | 4.90443E+04 | 2.50949E−02 |
| B18 | −5.68227E−11 | 1.59735E−05 | 1.22487E−04 | 7.92883E−02 | −1.02677E+04 | 5.25043E−02 |
| B19 | −5.37297E−10 | 1.75314E−05 | 5.74794E−05 | 7.45992E−02 | −1.61194E+05 | 2.09098E−02 |
| B20 | 8.84899E−11 | −5.70999E−06 | −3.76576E−05 | −4.45220E−02 | 1.36354E+05 | −3.07445E−02 |

TABLE 16

Example 8 Aspherical Surface Data

| si  | 3            | 4            | 5            | 6            | 8            | 9            |
|-----|--------------|--------------|--------------|--------------|--------------|--------------|
| K   | 0            | 0            | 0            | 0            | 0            | 0            |
| B3  | 3.31255E−01  | 7.81642E−01  | 4.27991E−01  | 2.32984E−02  | −3.49090E−01 | 5.36391E−02  |
| B4  | −6.86597E−02 | −2.18697E−01 | 1.07860E−01  | 1.71325E−01  | 3.42991E+00  | −2.01475E−01 |
| B5  | 1.22122E−03  | 1.63870E−01  | −4.08242E−01 | −2.84036E−01 | −1.41126E+01 | 3.44064E−01  |
| B6  | −7.92760E−04 | 4.59994E−02  | 1.59613E−01  | 2.20044E−01  | 1.45937E+01  | −5.45270E−02 |
| B7  | −3.89814E−04 | −9.20271E−03 | 1.03810E−01  | 1.31562E−01  | 3.59451E+01  | −2.26957E−02 |
| B8  | 2.73299E−04  | −6.45529E−02 | −2.18327E−02 | 1.37335E−02  | 3.41639E+01  | −4.30740E−01 |
| B9  | −1.20092E−05 | −1.89167E−02 | −4.21986E−02 | −3.03469E−01 | −5.10499E+02 | 2.35697E−01  |
| B10 | 2.21411E−07  | 2.25844E−02  | 2.67094E−03  | −1.76744E−01 | 3.45651E+02  | 2.35376E−01  |
| B11 | 1.48539E−06  | −9.70726E−06 | 6.98253E−03  | 3.40228E−01  | 1.23849E+03  | 4.90114E−02  |
| B12 | −5.80385E−07 | 1.67504E−04  | 3.50574E−03  | 3.62878E−01  | −1.23741E+02 | −3.86469E−02 |
| B13 | −1.11525E−07 | −1.17825E−04 | 3.39266E−05  | −4.26406E−01 | −1.44797E+03 | −7.87345E−02 |
| B14 | −3.11264E−08 | −1.22839E−04 | −9.76987E−04 | −1.58022E−01 | −4.26434E+03 | −7.12486E−02 |
| B15 | −5.36088E−10 | −9.95548E−05 | −7.24161E−04 | 3.71372E−01  | −2.44421E+03 | −3.73169E−02 |
| B16 | 6.19375E−09  | −5.95826E−05 | −1.72384E−04 | −1.72999E−01 | 3.97231E+03  | −3.19576E−03 |
| B17 | 2.56661E−09  | −5.88284E−06 | 7.76195E−05  | −1.15243E−01 | 4.90443E+04  | 2.50949E−02  |
| B18 | −5.68227E−11 | 1.59735E−05  | 1.22487E−04  | 7.92883E−02  | −1.02677E+04 | 5.25043E−02  |
| B19 | −5.37297E−10 | 1.75314E−05  | 5.74794E−05  | 7.45992E−02  | −1.61194E+05 | 2.09098E−02  |
| B20 | 8.84899E−11  | −5.70999E−06 | −3.76576E−05 | −4.45220E−02 | 1.36354E+05  | −3.07445E−02 |

In each of Examples 1 to 8, first lens L1 is made of optical glass and has a spherical surface on each side. This ensures favorable weather resistance, is less prone to damages arising from earth and sand, and can be manufactured at a relatively low cost. In order to prevent performance change due to moisture absorption, low absorbent materials are used for second lens L2 and fourth lens L4 of Examples 1 to 8, that is, second lens L2 is made of a polyolefin plastic and fourth lens L4 is made of a polycarbonate plastic.

Various types of data of Examples 1 to 8, including values corresponding to Conditional Expressions (1) to (5), (6A), and (6B) are shown in Table 17. Examples 1 to 8 use e-line as the reference wavelength and Table 17 shows various values at the reference wavelength.

In Table 17, f represents a focal length of the entire system, Bf represents a distance from the image side surface of the lens disposed on the most image side to the image plane on the optical axis (corresponding to back focus), L represents a distance from the object side surface of first lens L1 to the image plane, Fno. represents F-number, and 2ω represents total angle of view. Bf is air equivalent length, that is, value obtained by air-converting the thickness of the optical member PP. Likewise, an air equivalent length is used for back focus portion of L. A maximum image height of each of Examples 1 to 8 is 1.95 mm. As Table 17 shows, Examples 1 to 5 satisfy Conditional Expressions (1) to (5) and (6A), while Examples 6 to 8 satisfy Conditional Expressions (1) to (5) and (63).

Each of the Tables given above includes numerical values rounded to a predetermined number of significant digits. Unit for angles is "°" and unit for lengths is "mm". But, these are only examples, and other appropriate units may also be used since identical optical performance may be obtained from an optical system when it is proportionally enlarged or reduced.

FIG. 9A to 9G illustrate respective aberrations of the image pickup lens of Example 1 of the present invention. FIGS. 9A to 9D illustrate spherical aberration, astigmatism, distortion, and chromatic aberration of magnification respectively. FIGS. 9E to 9G illustrate a lateral aberration in a tangential direction in each half angle of view. Each aberration diagram shows an aberration with respect to e-line used as the reference wavelength. The spherical aberration diagram and chromatic aberration of magnification diagram also illustrate aberrations with respect to g-line (wavelength of 436 nm) and c-line (wavelength of 656.27 nm). The "Fno." shown in the spherical aberration diagram represents an F-number and ω in the other diagrams represents a half angle of view.

Likewise, aberration diagrams of spherical aberration, astigmatism, distortion, chromatic aberration of magnification, and lateral aberration of each of Examples 2 to 8 are shown in FIGS. 10A to 10G, FIGS. 11A to 11G, FIGS. 12A to 12G, FIGS. 13A to 13G, FIGS. 14A to 14G, FIGS. 15A to 15G, and FIGS. 16A to 16G respectively.

Note that each distortion diagram illustrates an amount of displacement from an ideal image height obtained by 2×f×tan (φ/2), in which f is a focal length of the entire system and φ is

TABLE 17

|       | Example 1 | Example 2 | Example 3 | Example 4 | Example 5 | Example 6 | Example 7 | Example 8 |
|-------|-----------|-----------|-----------|-----------|-----------|-----------|-----------|-----------|
| f     | 0.808     | 0.779     | 0.878     | 0.830     | 0.842     | 0.850     | 0.823     | 0.815     |
| Bf    | 1.847     | 1.802     | 2.240     | 1.665     | 1.681     | 1.606     | 1.769     | 1.763     |
| L     | 11.494    | 11.383    | 11.372    | 11.364    | 11.301    | 9.726     | 10.276    | 10.302    |
| Fno.  | 2.8       | 2.8       | 2.8       | 2.8       | 2.8       | 2.9       | 2.9       | 2.9       |
| 2ω    | 215.6°    | 217.6°    | 211.4°    | 209.0°    | 209.8°    | 210.0°    | 201.0°    | 206.4°    |
| f1/f  | −9.377    | −9.728    | −8.343    | −8.200    | −7.880    | −7.811    | −8.170    | −8.171    |
| d2/L  | 0.218     | 0.227     | 0.184     | 0.194     | 0.188     | 0.197     | 0.182     | 0.181     |
| d4/L  | 0.039     | 0.039     | 0.039     | 0.039     | 0.039     | 0.046     | 0.043     | 0.043     |
| f2/f3 | −0.666    | −0.691    | −0.502    | −1.037    | −1.080    | −0.882    | −0.283    | −0.185    |
| L/f34 | 4.745     | 4.776     | 5.256     | 5.591     | 5.867     | 5.931     | 6.326     | 6.409     |
| r5/r4 | −0.182    | −0.072    | −0.041    | −1.365    | −2.616    | 5.996     | 7.057     | 6.453     | a half angle of view (treated as a variable, $0 \leq \phi \leq \omega$, so that the distortion becomes negative in a peripheral portion. But, the distortions of image pickup lenses of Examples 1 to 8 take large positive values if calculated with respect to an image height based on equidistant projection. The reason is that the consideration is given to the image pickup lenses of Examples 1 to 8 so that a peripheral image is taken large in comparison with a lens designed to suppress a distortion by image height based on equidistant projection.

As these data indicate, image pickup lenses of Examples 1 to 8 are configured compactly and inexpensively using only four lenses and yet have favorable optical performance with very wide total angles of view of about 201° to about 218°, small F-numbers of 2.8 to 2.9, and various aberration corrected high resolution. These image pickup lenses can be favorably used in surveillance cameras, vehicle cameras for taking images of front, side, and rear of the vehicles, and the like.

Figure 17:
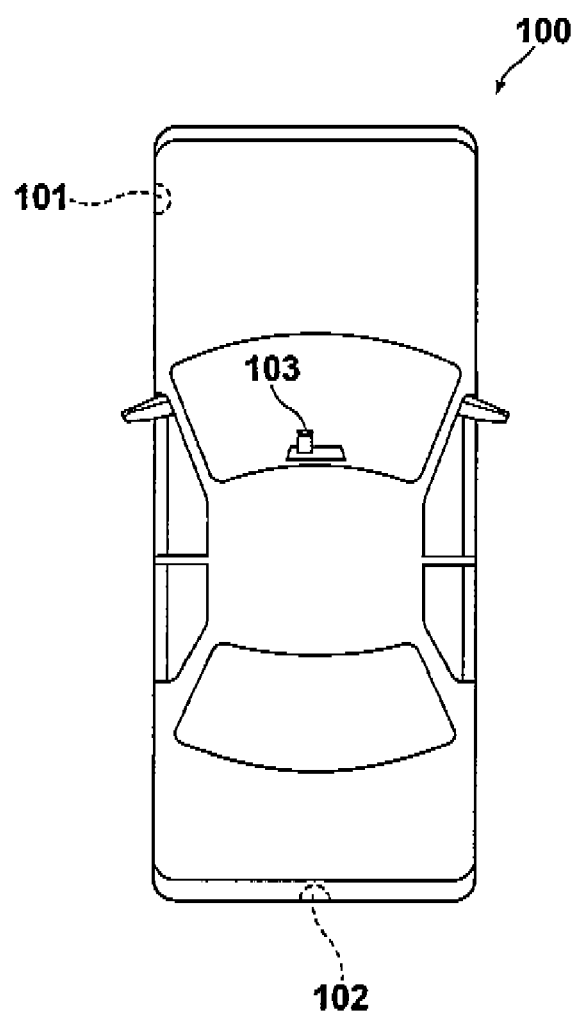
FIG. 17 illustrates a placement of a vehicle image pickup apparatus according to an embodiment of the present invention.

As a usage example, FIG. 17 illustrates automobile 100 in which an image pickup apparatus having an image pickup lens of the present invention is mounted. In FIG. 17, automobile 100 has vehicle exterior camera 101 for imaging a blind area on the front passenger seat side, vehicle exterior camera 102 for imaging a blind area on the rear side, and in-vehicle camera 103 attached to the rear side of a rearview mirror to image a view range identical to that of a driver. Vehicle exterior camera 101, vehicle exterior camera 102, and in-vehicle camera 103 are image pickup apparatuses according to an embodiment of the present invention, and include image pickup lenses of examples of the present invention and image sensors for converting optical images formed by the image pickup lenses to electrical signals.

As image pickup lenses according to the examples of the present invention have advantageous effects described above, vehicle exterior camera 101, vehicle exterior camera 102, and in-vehicle camera 103 can be structured compactly and inexpensively, and favorable images having wide angles of view and high resolution may be obtained.

So far the present invention has been described by way of embodiments and examples, but the invention is not limited to the embodiments and examples described above and various modifications and changes may be made. For example, values of the radius of curvature, surface separation, refractive index, Abbe number, aspherical coefficient of each lens element are not limited to those shown in each of the numeric value examples and may take other values. Further, the materials of the lenses are not limited to those used in each of the numeric value examples and other materials may also be used.

Further, in the embodiment of the image pickup apparatus, the description has been made, with reference to a drawing, of a case in which the present invention is applied to a vehicle camera. But the application of the present invention is not limited to the vehicle camera and the invention may also be applied, for example, to cameras of portable terminal devices, surveillance cameras, and the like.

What is claimed is:

1. An image pickup lens, comprising the following disposed from an object side in the order listed below:
    a first lens which is a meniscus lens having a negative power and a concave surface on an image side;
    a second lens having an aspherical surface on each of the object and image sides and a negative power adjacent to an optical axis, the object side surface having a concave shape adjacent to the optical axis and the image side surface having a convex shape adjacent to the optical axis;
    a third lens having an aspherical surface on each of the object and image sides and a positive power adjacent to the optical axis, the image side surface having a convex shape adjacent to the optical axis;
    an aperture; and
    a fourth lens having an aspherical surface on each of the object and image sides and a positive power adjacent to the optical axis, the object side surface having a convex shape adjacent to the optical axis and the image side surface having a convex shape adjacent to the optical axis,
    wherein the image pickup lens satisfies Conditional Expression (5) given below when a combined focal length of the third lens and the fourth lens is taken as f34 and a distance from a surface apex of the object side surface of the first lens to an image plane is taken as L $$4.0 < L/f34 < 8.0 \qquad (5).$$

2. The image pickup lens of claim 1, wherein the image pickup lens satisfies Conditional Expression (1) given below when a focal length of the first lens is taken as f1 and a focal length of the entire system is taken as f $$-12.0 < f1/f < -5.0 \qquad (1).$$

3. The image pickup lens of claim 1, wherein the image pickup lens satisfies Conditional Expression (2) given below when a distance between the first lens and the second lens on the optical axis is taken as d2 and a distance from a surface apex of the object side surface of the first lens to an image plane is taken as L $$0.15 < d2/L < 0.25 \qquad (2).$$

4. The image pickup lens of claim 1, wherein the image pickup lens satisfies Conditional Expression (3) given below when a distance between the second lens and the third lens on the optical axis is taken as d4 and a distance from a surface apex of the object side surface of the first lens to an image plane is taken as L $$0.02 < d4/L < 0.05 \qquad (3).$$

5. The image pickup lens of claim 1, wherein the image pickup lens satisfies Conditional Expression (4) given below when a focal length of the second lens is taken as f2 and a focal length of the third lens is taken as f3

$$-1.2 < f2/f3 < -0.1 \qquad (4).$$

6. An image pickup lens, comprising the following disposed from an object side in the order listed below:
    a first lens which is a meniscus lens having a negative power and a concave surface on an image side;
    a second lens having an aspherical surface on each of the object and image sides and a negative power adjacent to an optical axis, the object side surface having a concave shape adjacent to the optical axis and the image side surface having a convex shape adjacent to the optical axis;
    a third lens having an aspherical surface on each of the object and image sides and a positive power adjacent to the optical axis, the image side surface having a convex shape adjacent to the optical axis;
    an aperture; and
    a fourth lens having an aspherical surface on each of the object and image sides and a positive power adjacent to the optical axis, the object side surface having a convex shape adjacent to the optical axis and the image side surface having a convex shape adjacent to the optical axis, wherein the object side surface of the third lens has a convex shape adjacent to the optical axis and the image pickup lens satisfies Conditional Expression (6A) given below when a radius of paraxial curvature of the image side surface of the second lens is taken as r4 and a radius of paraxial curvature of the object side surface of the third lens is taken as r5

$$-5.0 < r5/r4 < 0.0 \quad (6A).$$

7. An image pickup lens, comprising the following disposed from an object side in the order listed below:
- a first lens which is a meniscus lens having a negative power and a concave surface on an image side;
- a second lens having an aspherical surface on each of the object and image sides and a negative power adjacent to an optical axis, the object side surface having a concave shape adjacent to the optical axis and the image side surface having a convex shape adjacent to the optical axis;
- a third lens having an aspherical surface on each of the object and image sides and a positive power adjacent to the optical axis, the image side surface having a convex shape adjacent to the optical axis;
- an aperture; and
- a fourth lens having an aspherical surface on each of the object and image sides and a positive power adjacent to the optical axis, the object side surface having a convex shape adjacent to the optical axis and the image side surface having a convex shape adjacent to the optical axis,
- wherein the object side surface of the third lens has a concave shape adjacent to the optical axis and the image pickup lens satisfies Conditional Expression (6B) given below when a radius of paraxial curvature of the image side surface of the second lens is taken as r4 and a radius of paraxial curvature of the object side surface of the third lens is taken as r5

$$4.0 < r5/r4 < 8.0 \quad (6B).$$

8. The image pickup lens of claim 1, wherein an Abbe number of the material of the first lens with respect to d-line is not less than 40, an Abbe number of the material of the second lens with respect to d-line is not less than 50, an Abbe number of the material of the third lens with respect to d-line is not greater than 40, and an Abbe number of the material of the fourth lens with respect to d-line is not less than 50.

9. The image pickup lens of claim 1, wherein the image pickup lens has a total angle of view greater than 200°.

10. An image pickup apparatus comprising the image pickup lens of claim 1.

11. The image pickup lens of claim 6, wherein the image pickup lens satisfies Conditional Expression (1) given below when a focal length of the first lens is taken as f1 and a focal length of the entire system is taken as f $$-12.0 < f1/f < -5.0 \quad (1).$$

12. The image pickup lens of claim 6, wherein the image pickup lens satisfies Conditional Expression (2) given below when a distance between the first lens and the second lens on the optical axis is taken as d2 and a distance from a surface apex of the object side surface of the first lens to an image plane is taken as L $$0.15 < d2/L < 0.25 \quad (2).$$

13. The image pickup lens of claim 6, wherein the image pickup lens satisfies Conditional Expression (3) given below when a distance between the second lens and the third lens on the optical axis is taken as d4 and a distance from a surface apex of the object side surface of the first lens to an image plane is taken as L $$0.02 < d4/L < 0.05 \quad (3).$$

14. The image pickup lens of claim 6, wherein the image pickup lens satisfies Conditional Expression (4) given below when a focal length of the second lens is taken as f2 and a focal length of the third lens is taken as f3

$$-1.2 < f2/f3 < -0.1 \quad (4).$$

15. The image pickup lens of claim 6, wherein an Abbe number of the material of the first lens with respect to d-line is not less than 40, an Abbe number of the material of the second lens with respect to d-line is not less than 50, an Abbe number of the material of the third lens with respect to d-line is not greater than 40, and an Abbe number of the material of the fourth lens with respect to d-line is not less than 50.

16. The image pickup lens of claim 6, wherein the image pickup lens has a total angle of view greater than 200°.

17. An image pickup apparatus comprising the image pickup lens of claim 6.

18. The image pickup lens of claim 7, wherein the image pickup lens satisfies Conditional Expression (1) given below when a focal length of the first lens is taken as f1 and a focal length of the entire system is taken as f $$-12.0 < f1/f < -5.0 \quad (1).$$

19. The image pickup lens of claim 7, wherein the image pickup lens satisfies Conditional Expression (2) given below when a distance between the first lens and the second lens on the optical axis is taken as d2 and a distance from a surface apex of the object side surface of the first lens to an image plane is taken as L $$0.15 < d2/L < 0.25 \quad (2).$$

20. The image pickup lens of claim 7, wherein the image pickup lens satisfies Conditional Expression (3) given below when a distance between the second lens and the third lens on the optical axis is taken as d4 and a distance from a surface apex of the object side surface of the first lens to an image plane is taken as L $$0.02 < d4/L < 0.05 \quad (3).$$

21. The image pickup lens of claim 7, wherein the image pickup lens satisfies Conditional Expression (4) given below when a focal length of the second lens is taken as f2 and a focal length of the third lens is taken as f3

$$-1.2 < f2/f3 < -0.1 \quad (4).$$

22. The image pickup lens of claim 7, wherein an Abbe number of the material of the first lens with respect to d-line is not less than 40, an Abbe number of the material of the second lens with respect to d-line is not less than 50, an Abbe number of the material of the third lens with respect to d-line is not greater than 40, and an Abbe number of the material of the fourth lens with respect to d-line is not less than 50.

23. The image pickup lens of claim 7, wherein the image pickup lens has a total angle of view greater than 200°.

24. An image pickup apparatus comprising the image pickup lens of claim 7.

* * * * *